US011386663B1

(12) United States Patent
Perea et al.

(10) Patent No.: US 11,386,663 B1
(45) Date of Patent: Jul. 12, 2022

(54) REFERENCE-FREE SYSTEM FOR DETERMINING QUALITY OF VIDEO DATA

(71) Applicant: HEADSPIN, INC, Palo Alto, CA (US)

(72) Inventors: Brian Perea, Menlo Park, CA (US); James Morad, Belmont, CA (US); Daweon Ryu, Menlo Park, CA (US); Brien Colwell, Redwood City, CA (US)

(73) Assignee: HEADSPIN, INC., Palo Alto, CA (US)

( * ) Notice: Subject to any disclaimer, the term of this patent is extended or adjusted under 35 U.S.C. 154(b) by 39 days.

(21) Appl. No.: 17/006,596

(22) Filed: Aug. 28, 2020

(51) Int. Cl.
*G06K 9/62* (2022.01)
*G06V 20/40* (2022.01)
*G06V 10/56* (2022.01)

(52) U.S. Cl.
CPC .......... *G06V 20/46* (2022.01); *G06K 9/6256* (2013.01); *G06V 10/56* (2022.01)

(58) Field of Classification Search
CPC . G06K 9/00744; G06K 9/4652; G06K 9/6256
USPC ........................................................ 382/155
See application file for complete search history.

(56) References Cited

U.S. PATENT DOCUMENTS

| 5,233,611 | A  | 8/1993  | Triantafyllos et al. |
|-----------|----|---------|----------------------|
| 8,094,211 | B2 | 1/2012  | Kwon et al.          |
| 8,175,538 | B1 | 5/2012  | Chen et al.          |
| 8,621,091 | B1 | 12/2013 | Akalin et al.        |
| 9,170,922 | B1 | 10/2015 | Lachwani et al.      |
| 9,356,883 | B1 | 5/2016  | Borthakur            |
| 9,507,566 | B2 | 11/2016 | Payne et al.         |
| 9,525,891 | B2 | 12/2016 | Kim                  |
| 9,660,895 | B1 | 5/2017  | Bennett              |
| 9,681,318 | B1 | 6/2017  | Lachwani et al.      |
| 9,749,888 | B1 | 8/2017  | Colwell et al.       |
| 10,432,945 | B2 | 10/2019 | Alshin et al.       |
| 2001/0049263 | A1 | 12/2001 | Zhang              |
| 2002/0013841 | A1 | 1/2002  | Schweitzer et al.  |
| 2004/0060056 | A1 | 3/2004  | Wellons et al.     |
| 2005/0114706 | A1 | 5/2005  | DeStefano et al.   |
| 2005/0286802 | A1 | 12/2005 | Clark et al.       |

(Continued)

OTHER PUBLICATIONS

Doan, Phuoc Huu, "Final Office Action dated Nov. 4, 2016", U.S. Appl. No. 14/850,798, The United States Patent and Trademark Office, dated Nov. 4, 2016.

(Continued)

*Primary Examiner* — Ali Bayat
(74) *Attorney, Agent, or Firm* — Lindauer Law, PLLC

(57) ABSTRACT

A machine learning system is trained to determine scores indicative of a quality of video data based on the characteristics of the video data, without requiring information regarding the correct appearance or other aspects of the video content. To train the machine learning system, users input scores for videos having predetermined quality scores, videos that have been previously seen by the users, and videos that have not been previously seen by the users. The differences between a user's score and a predetermined score or a score previously input by the user are used to determine a consistency metric. The scores and consistency metrics determined for a group of users, and the video characteristics of the videos presented to the users, are used to train the machine learning system to determine scores indicative of the quality of a video based on the characteristics of the video.

20 Claims, 8 Drawing Sheets

(56) References Cited

U.S. PATENT DOCUMENTS

| | | |
|---|---|---|
| 2006/0195894 A1 | 8/2006 | Nita et al. |
| 2006/0293777 A1 | 12/2006 | Breitgand et al. |
| 2007/0055476 A1 | 3/2007 | Whisnant et al. |
| 2007/0094356 A1 | 4/2007 | Sethi et al. |
| 2007/0121674 A1 | 5/2007 | Chen et al. |
| 2010/0094990 A1 | 4/2010 | Ben-Yehuda et al. |
| 2010/0211882 A1 | 8/2010 | Bailey et al. |
| 2011/0081088 A1 | 4/2011 | Xiao |
| 2011/0090939 A1 | 4/2011 | Diener et al. |
| 2011/0151864 A1 | 6/2011 | Byun et al. |
| 2012/0158908 A1 | 6/2012 | Luna et al. |
| 2013/0003857 A1 | 1/2013 | Yu et al. |
| 2013/0074048 A1 | 3/2013 | Osawa et al. |
| 2014/0040628 A1 | 2/2014 | Fort et al. |
| 2014/0113625 A1 | 4/2014 | Gruber et al. |
| 2014/0118239 A1 | 5/2014 | Phillips |
| 2014/0219630 A1* | 8/2014 | Minder ............... H04N 21/8549 386/241 |
| 2014/0240522 A1* | 8/2014 | Lee ....................... H04N 17/004 348/193 |
| 2014/0340697 A1 | 11/2014 | Kisilev et al. |
| 2014/0359139 A1 | 12/2014 | Efrati et al. |
| 2015/0208258 A1 | 7/2015 | Brenzel et al. |
| 2015/0269059 A1 | 9/2015 | Srinivasan et al. |
| 2015/0312127 A1 | 10/2015 | Leemet et al. |
| 2015/0319048 A1 | 11/2015 | Griff et al. |
| 2015/0340066 A1* | 11/2015 | Lokshin ............... G11B 27/031 386/201 |
| 2015/0370304 A1 | 12/2015 | Salah et al. |
| 2016/0133231 A1 | 5/2016 | Liu et al. |
| 2016/0205720 A1 | 7/2016 | Mandanapu |
| 2016/0254967 A1 | 9/2016 | Brown et al. |
| 2016/0267930 A1 | 9/2016 | Chu et al. |
| 2017/0085872 A1 | 3/2017 | Perron et al. |
| 2017/0347091 A1 | 11/2017 | Madhani et al. |
| 2018/0060222 A1 | 3/2018 | Kogan et al. |
| 2018/0336122 A1 | 11/2018 | Kogan et al. |
| 2019/0028465 A1 | 1/2019 | Allen et al. |
| 2020/0169718 A1* | 5/2020 | Begeja ................. H04N 13/388 |
| 2020/0327408 A1* | 10/2020 | Ro ......................... G06T 19/006 |
| 2021/0056676 A1* | 2/2021 | Whitehill ............. G06K 9/6256 |

OTHER PUBLICATIONS

Doan, Phuoc Huu, "Non-final Office Action dated Jun. 2, 2016", U.S. Appl. No. 14/850,798, The United States Patent and Trademark Office, dated Jun. 2, 2016.

Doan, Phuoc Huu, "Notice of Allowance dated Feb. 14, 2017", U.S. Appl. No. 14/850,798, The United States Patent and Trademark Office, dated Feb. 14, 2017.

Lee, Gil H., "Non-final Office Action dated Apr. 1, 2020", U.S. Appl. No. 16/056,797, The United States Patent and Trademark Office, dated Apr. 1, 2020.

Nandy, et al., "A Study on Gait Entropy Image Analysis for Clothing Invariant Human Identification", Springer Science, 2016, pp. 9133-9167.

Tsai, et al., "Information Entropy Measure for Evaluation of Image Quality", Journal of Digital Imaging, 2007, pp. 1-10.

Vo, Ted T., "Non-final Office Action dated Jun. 12, 2020", U.S. Appl. No. 16/297,380, The United States Patent and Trademark Office, dated Jun. 12, 2020.

Wu, Daxin, "Final Office Action dated Sep. 13, 2019", U.S. Appl. No. 15/941,674, The United States Patent and Trademark Office, dated Sep. 13, 2019.

Wu, Daxin, "Non-final Office Action dated Mar. 5, 2019", U.S. Appl. No. 15/941,674, The United States Patent and Trademark Office, dated Mar. 5, 2019.

Young, Lee W., "Patent Cooperation Treaty International Search Report and Written Opinion dated Jun. 6, 2019", Patent Cooperation Treaty Application No. PCT/US19/21673, Patent Cooperation Treaty, dated Jun. 6, 2019.

\* cited by examiner

REFERENCE-FREE SYSTEM FOR DETERMINING QUALITY OF VIDEO DATA

BACKGROUND

Various methods may be used to determine the manner in which an application functions at different locations, on different devices, and under different network conditions. When a device executing an application experiences a failure or suboptimal performance, acquiring information at the device about the characteristics of the network may be useful to mitigate failures or improve performance.

INCORPORATION BY REFERENCE

U.S. patent application Ser. No. 14/850,798, filed Sep. 10, 2015 and titled "System for Application Test", now U.S. Pat. No. 9,681,318, is hereby incorporated by reference in its entirety.

U.S. patent application Ser. No. 15/941,674, filed Mar. 30, 2018 and titled "Interactive Application Testing System Using Remote Resources" is hereby incorporated by reference in its entirety.

U.S. patent application Ser. No. 16/056,797, filed Aug. 7, 2018 and titled "System for Controlling Transfer of Data to a Connected Device" is hereby incorporated by reference in its entirety.

U.S. patent application Ser. No. 16/297,380, filed Mar. 8, 2019 and titled "System to Determine Performance Based on Entropy Values" is hereby incorporated by reference in its entirety.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1A:
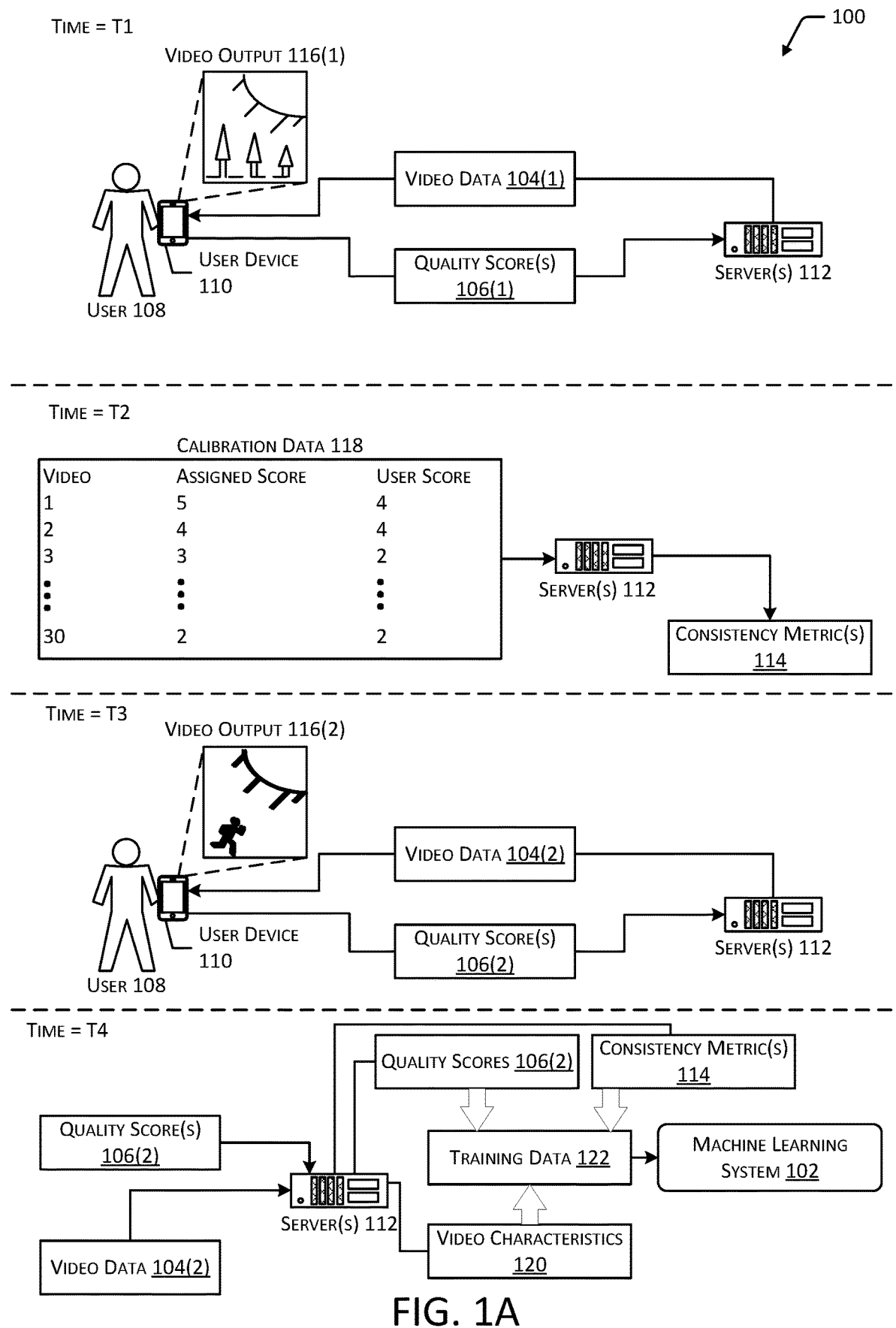
FIG. 1A depicts an implementation of a process for training a machine learning system based on characteristics of video data and quality scores input by a user.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

A computing device may execute an application to provide various functions. Computing devices may include, for example, smartphones, laptops, tablet computers, embedded devices, network-enabled devices, wearable computing devices, appliances, computing devices associated with vehicles, and so forth. Functions provided by an application may include, without limitation, retrieval or transmission of data, presentation of data using a display device, processing of data, and so forth. For example, a function may include presenting one or more images or videos to a user.

One method by which the performance of an application may be evaluated may include determining the quality of images or videos that are presented. For example, when affected by poor network conditions, a presented video may freeze, buffering or loading animations may be displayed, the video may appear blurry or pixelated, and so forth. As another example, an application exhibiting suboptimal performance or design may cause presentation of videos having poor color saturation, brightness, contrast, or other characteristics.

However, the quality of a presented video, as perceived by a user, is often a subjective determination in which no particular characteristics are always determinative of quality and no particular set of rules may always be applicable. For example, a first video having a blurry appearance may be indicative of poor quality, while a second video having a blurry appearance may be aesthetically pleasing and indicative of high quality. Computer-implemented methods for determining the quality of a presented video suffer from various limitations. For example, while a user can view a video and provide a subjective indication of quality without existing knowledge or information regarding the video, a computer-implemented method typically requires a structural analysis of source video content, which is then compared to suboptimal video content on a frame-by-frame basis. Such comparisons normally require the source video and the suboptimal video to have similar characteristics, such as the same frame rate, frame dimensions, and so forth. Such comparisons are also normally limited to an evaluation of measurable characteristics of the suboptimal video when compared to the source video.

Described in this disclosure are techniques for training a machine learning system to evaluate the quality of video data based on characteristics of the video data, without requiring information regarding the correct or expected appearance or other aspects of the video data. One example machine learning system may include a neural network, such as a convolutional neural network (CNN). The machine learning system may be trained using inputs from users, such as a user input score indicating a perceived quality of the video data. The machine learning system may also use the characteristics of the evaluated video data. For example, a user input quality score for a video and the video characteristics of the video may be used to generate training data for training of the neural network. Training of the machine learning system based on user input quality scores and video characteristics may enable the machine learning system to simulate the subjective measurement of video quality that may be provided by users. For example, a trained machine learning system may process a video and determine an estimated score for one or more frames of the video based on the characteristics of the frames.

To generate training data to train a machine learning system, a user may view a first set of video data in which each video within the first set is associated with a known or accepted quality score. The user may then provide input indicating a quality score for each video in the first set. In one implementation, a quality score may include a numerical value, such as an integer ranging from zero to four, or an integer ranging from one to five, with greater values representing a higher quality. In some implementations, a known quality score may be assigned to each video in the first set by one or more administrators, experts, content curators, and so forth. In other implementations, a known quality score may be associated with one or more videos based on previous evaluations of the videos by users. For example, if at least a threshold number or percentage of users evaluate a video with the same quality score, the video may be associated with this quality score. After the user has evaluated the videos in the first set of video data, differences between the known or accepted quality scores for each video and the quality scores input by the user may be determined. These differences may be used to determine a consistency metric for the user and the presence or absence of biases of the user when evaluating content. For example, a user may exhibit a tendency to consistently input quality scores that are greater than the known or accepted quality scores of videos or less than the known or accepted quality scores of videos. The determined consistency metric for a user may be used to adjust scores received from a user or affect the weight or influence of the scores when used as training data to train a CNN or other type of machine learning system. In cases where the quality scores input by a user are inconsistent with regard to the known or accepted quality scores of videos, subsequent input by the user may be disregarded. For example, a low consistency metric may result in scores provided by the user having little or no weight or influence on the training of a machine learning system. In other implementations, differences between scores input by the user and the known or accepted scores for videos may be used to determine a corrective factor. A corrective factor may include a modification that decreases scores that the user provides after viewing subsequent videos. In some implementations, a corrective factor may also be determined in part based on characteristics of the user, such as a location of the user, or characteristics of a device associated with the user, such as a type of display used to present the videos.

At a subsequent time, the user may view a second set of video data and provide input indicating a quality score for each video in the second set. The quality scores that are input by the user, which may be adjusted or weighted based on the consistency metric determined for the user, and the characteristics of the second set of video data are then used to generate training data that may be used to train the machine learning system. The trained machine learning system may then process video data and determine an estimated score for that video data based on the characteristics of the video data. In some implementations, a portion of the second set of video data may be used to modify or determine a new consistency metric for the user. For example, a portion of the second set may include video data associated with known or accepted quality scores, and a difference between user input quality scores and the known or accepted quality scores may be used to modify the consistency metric. As another example, a portion of the second set may include video data that has been previously viewed by the user and a difference between a current user input quality score and the quality score that the user previously input may be used to modify the consistency metric.

The trained machine learning system may be used to determine an estimated score for subsequent video data. In some implementations, the machine learning system may determine one or more vectors or an embedding based on the characteristics of a video. The vectors or embedding may be used to determine various statistical values, such as one or more mean values, minimum values, maximum values, and standard deviations for one or more characteristics of the video. When the machine learning system is used to determine an estimated score for the subsequent video data, in some implementations, an output may be generated that indicates an estimated score for one or more frames of the video data and associates the estimated score with other information. For example, the output may associate the estimated score with an indication of network conditions or activities of the application that occurred at the time when the frames of video data were presented. As another example, the output may associate the estimated score with an indication of the characteristics of the frames of video data that influenced the estimated score. Information determined using the trained machine learning system may be useful when testing or attempting to improve the performance of an application, determining characteristics of devices or networks that may affect the performance, and so forth.

Example characteristics of video data that may influence an estimated score for the video data may include, without limitation: a frame rate, a variation in the frame rate, blurriness (e.g., an amount of spread of edges in a frame of video data), variation in blurriness in a set of frames, blockiness (e.g., an appearance of block structures in a frame), a variation in blockiness, color saturation, a variation in color saturation in a set of frames, contrast, a variation in contrast in a set of frames, brightness, or a variation in brightness in a set of frames. Other example characteristics may include presence of a graphic that indicates buffering, freezing, or loading of a video, or an identical image present in a set of frames that may indicate that presentation of the video has frozen.

Implementations described herein may therefore enable a machine learning system to be trained to determine a simple metric indicative of the quality of a video, such as a score, without requiring information regarding the correct or expected appearance of the video. The machine learning system may simulate the subjective evaluation of a user when trained using training data that is based on user input quality scores and characteristics of video data. Additionally, while implementations described herein refer to video data, other implementations may include training of a machine learning system to determine a quality score for audio data, or other types of data. For example, users may provide quality scores in response to sets of audio data, and the quality scores and characteristics of the audio data may be used to generate training data to train the machine learning system.

FIG. 1A depicts an implementation of a process 100 for training a machine learning system 102 based on characteristics of video data 104 and quality scores 106 input by a user 108. One example machine learning system 102 may include a convolutional neural network (CNN). At a first time T1, a first set of video data 104(1) may be provided to a user device 110 associated with the user 108. For example, FIG. 1A depicts one or more servers 112 providing the video data 104(1) to a smartphone carried by the user 108. While FIG. 1A depicts the user device 110 as a smartphone, any type of computing device may be used including, without limitation, portable computing devices, wearable computing devices, embedded computing devices, mobile computing devices, media devices, personal computing devices, and so forth. Additionally, while FIG. 1A depicts the server(s) 112 providing the video data 104(1) to the user device 110, any type of computing device including, without limitation, those described with regard to the user device 110 may be used. In other implementations, the user device 110 may store the video data 104(1) or may retrieve the video data 104(1) from a data store accessible to the user device 110. In such a case, use of a separate server 112 may be omitted. For example, at least a portion of the functions described herein with regard to the server(s) 112 may be performed by the user device 110 or by another computing device in communication with the user device 110.

In some implementations, the first set of video data 104(1) may include curated content selected by one or more administrators, experts, content creators, content curators, and so forth. For example, a body of video data 104 may be curated to ensure diverse types of video content, such as different resolutions, frame rates, content types, live and non-live sources, content associated with optimal and sub-optimal network conditions, content associated with presentation using different types of devices or viewing modes, and so forth. In some implementations, a source video may be used to generate multiple video clips. For example, a source video may have a length of approximately two minutes, may be encoded in H.264 and stored in an MP4 container, and may be separated into segments having a selected length, such as five seconds. Multiple videos may be processed in this manner to generate a body of video clips that represent diverse types of video content. Each video clip may be associated with a known quality score 106. In some implementations, a quality score 106 may be assigned to a video clip by an administrator, expert, content curator, or other individual. In other implementations, a quality score 106 may be associated with a video clip if a threshold number or threshold percentage of users 108 that have evaluated the video clip provide the same quality score 106.

The first set of video data 104(1) may include a selected number of video clips that are determined in this manner. In some implementations, the first set of video data 104(1) may include no more than one video clip from a particular source video, and at least one video clip associated with each possible quality score 106. For example, the first set of video data 104(1) may include thirty video clips, each video clip having a length of five seconds, and each video clip determined from a different source video. Continuing the example, six of the video clips may be associated with a quality score 106 of "excellent" or "5", six of the video clips may be associated with a quality score 106 of "good" or "4", six of the video clips may be associated with a quality score 106 of "fair" or "3", six of the video clips may be associated with a quality score 106 of "poor" or "2", and six of the video clips may be associated with a quality score 106 of "very poor" or "1". The quality scores 106 for each video clip may be indicative of a perceived quality of video output 116 based on the video clip. For example, if a video output 116 exhibits high blurriness or blockiness, poor color saturation, brightness, or contrast, if the video output 116 freezes or includes graphics or animations indicative of loading or buffering, and so forth, these characteristics may cause the perceived quality of the video output 116 to be poor. In contrast, video output 116 that is properly colored, not blurry, and is displayed smoothly without freezing or buffering animations may be perceived as having high quality. Presentation of a first set of video data 104(1) that includes video clips having diverse quality scores 106 may be used to determine a consistency metric 114 for the user 108. The consistency metric 114 may be used to improve the accuracy of inputs used to train a machine learning system 102. For example, if the user 108 consistently provides quality scores 106 that are greater than, less than, or equal to the assigned quality scores for the first video data 104(1), a consistency metric 114 indicative of high consistency may be determined. In such a case, subsequent quality scores 106 provided by the user 108 may be associated with a high degree of confidence and may more significantly influence the training of a machine learning system 102 than scores associated with a lower consistency. For example, if a user 108 provides inconsistent quality scores 106 relative to the assigned quality scores 106 for the first video data 104(1), this may result in a consistency metric 114 indicative of low consistency and a low confidence in subsequent quality scores 106 received from the user 108. In such a case, subsequent quality scores 106 from the user 108 may not influence the training of the machine learning system 102 or may only slightly influence the training. In other implementations, differences between the quality scores 106(1) received from the user 108 and the assigned quality scores 106 of the first video data 104(1) may be used to determine a corrective value that may be used to modify subsequent quality scores 106 that the user 108 provides in response to other video data 104. In some cases, a distribution of quality scores 106 received from multiple users 108 may be used to determine the consistency metric 114 or one or more corrective values to be used to modify subsequent quality scores 106. For example, a Bayesian model may be used to predict the distribution of quality scores 106 for a video clip based on the quality scores 106 previously received with regard to the video clip. The degree to which a quality score 106(1) from the user 108 fits within an estimate using the Bayesian model may be used to determine the consistency metric 114. For example, if the quality score 106(1) from the user 108 deviates significantly from the Bayesian estimate, this may result in quality scores 106 from the user 108 having less influence in the training of the machine learning system 102.

FIG. 1A depicts the user device 110 presenting a video output 116(1) based on the received video data 104(1). After viewing a video output 116(1), the user 108 may provide user input indicative of a quality score 106(1). The quality scores 106(1) provided by the user 108 may then be sent from the user device 110 to the server(s) 112. In other implementations, the user device 110 or another computing device in communication with the user device 110 may receive or process the quality score(s) 106(1). At a second time T2, after receiving the quality scores 106(1), the server(s) 112 may determine calibration data 118 based on the quality scores 106(1) and the video data 104(1) that was provided to the user device 110. The calibration data 118 may associate an identifier for each video clip of the first set of video data 104(1) with an assigned score (e.g., a known or accepted quality score 106 that is assigned to or associated with a video clip). The calibration data 118 may also associate each quality score 106(1) received from the user device 110 with a corresponding video clip. Based on the differences between the assigned score for a video clip and the quality score 106(1) received from the user device 110, the server(s) 112 may determine a consistency metric 114 for the user 108. In cases where the differences between the assigned scores for video clips and the quality scores 106(1) received from the user device 110 are greater than a threshold value or are inconsistent, future quality scores 106 from the user 108 may be disregarded. For example, the user 108 may be prevented from further evaluation of video clips, or subsequent quality scores 106 from the user 108 may have no influence or very little influence on the training of the machine learning system 102.

In other implementations, a correction factor may be determined based in part on the consistency metric 114 and may include one or more of a modifier that is added to or subtracted from subsequent quality scores 106 or a multiplier by which subsequent quality scores 106 associated with the user 108 are multiplied. Additionally, in some implementations, multiple consistency metrics 114 may be determined for a user 108. For example, a user 108 may exhibit a tendency to consistently provide quality scores 106 greater than a known or accepted quality score 106 for a first type of content, quality scores 106 less than a known or accepted quality score 106 for a second type of content, and inconsistent quality scores 106 for a third type of content. In such a case, different consistency metrics 114 may be used depending on the types of subsequent content presented to the user 108. In some implementations, the characteristics of a video clip may be determined, such as by a machine learning system 102, and a Bayesian model may be used to predict a distribution for a given video clip based on the characteristics of the video clip. The difference between a quality score 106 received from a user 108 and an estimate using the Bayesian model may be used to determine the consistency metric 114. In some implementations, the consistency metric 114 may also be determined based on characteristics of the user 108, such as a location, or characteristics of the user device 110, such as a type or size of a display. For example, users 108 who reside in a first country may exhibit a tendency to provide higher or lower quality scores 106 for particular types of content than users 108 who reside in a second country. As another example, users 108 may exhibit a tendency to provide higher or lower quality scores 106 than the known or accepted quality scores 106 for a video clip when viewed on a display having a particular resolution.

At a third time T3, a second set of video data 104(2) may be provided to the user device 110. While the first set of video data 104(1) may be used to determine one or more consistency metrics 114 for the user 108, at least a portion of the second set of video data 104(2) may be used to train the machine learning system 102. For example, at least a portion of the second set of video data 104(2) may include video clips that are not included in the first set of video data 104(1) or that are not associated with a known or accepted quality score 106. In response to video output 116(2) based on each video clip of the second set of video data 104(2), the user 108 may input a quality score 106(2), which may be provided to the server(s) 112.

In some implementations, a portion of the second video data 104(2) may include one or more video clips that may be used to modify the consistency metric 114 for the user 108 or to determine a new consistency metric 114. For example, one or more video clips of the second video data 104(2) may include video clips that are associated with a known or accepted quality score 106, and differences between the quality score(s) 106(2) received from the user device 110 and the known or accepted quality score(s) 106 may be used to modify the consistency metric 114 for the user 108. In other implementations, one or more video clips of the second video data 104(2) may include video clips that have been previously viewed by the user 108 and for which a quality score 106 has been previously received from the user 108. The quality score 106(2) received at the third time T3 may be compared to the quality score 106 previously received from the user 108, and the consistency metric 114 may be modified based on a difference between the current quality score 106(2) and the previous quality score 106.

For example, the second set of video data 104(2) may include thirty video clips. Three of the video clips may be associated with a known or accepted quality score 106. For example, the three video clips may be retrieved from the same source of video data 104 from which the first set of video data 104(1) was selected. Three of the video clips may include video clips that have been previously viewed by the user 108 and for which a previous quality score 106 was received. The remaining twenty-four video clips may include video clips that are not associated with a known or accepted quality score 106 and that have not been previously viewed by the user 108.

At a fourth time T4, the quality score(s) 106(2) received from the user device 110 may be used to generate training data 122 to train the machine learning system 102. The server(s) 112 may process the second set of video data 104(2) to determine video characteristics 120 for each of the video clips. In some implementations, the video characteristics 120 may be determined for each frame of a video clip. For example, the server(s) 112 may determine, for a particular frame of a video clip, a frame rate, a blurriness metric, a blockiness metric, a color saturation, a contrast value, a brightness value, the presence or absence of a graphic that indicates buffering, freezing, or loading, and so forth. In some cases, the video characteristics 120 for a particular frame of a video clip may be determined based on the characteristics of other frames that occur before and after the particular frame. For example, the server(s) 112 may determine a variation in frame rate, blurriness, blockiness, color saturation, contrast, or brightness across multiple frames of a video clip. As another example, the presence of an identical or similar image across at least a threshold number of frames may indicate buffering, freezing, or loading of the video clip.

Example characteristics of video data 104 that may influence a quality score 106 for the video data 104 may include, without limitation: a frame rate, a variation in the frame rate, blurriness (e.g., an amount of spread of edges in a frame of video data), variation in blurriness in a set of frames, blockiness (e.g., an appearance of block structures in a frame), a variation in blockiness, color saturation, a variation in color saturation in a set of frames, contrast, a variation in contrast in a set of frames, brightness, or a variation in brightness in a set of frames. Other example characteristics may include presence of a graphic that indicates buffering, freezing, or loading of a video, or an identical image present in a set of frames that may indicate that presentation of the video has frozen.

The server(s) 112 may also use the quality score 106(2) received for each video clip and the determined consistency metric(s) 114 to train the machine learning system 102. For example, the quality scores 106, consistency metrics 114, and video characteristics 120 determined by presenting multiple sets of video data 104 to multiple users 108 may be used to generate training data 122. The training data 122 may be used to train the machine learning system 102. The trained machine learning system 102 may subsequently be used to determine an estimated score for other video data 104 based on the video characteristics 120 of that video data 104.

Figure 1B:
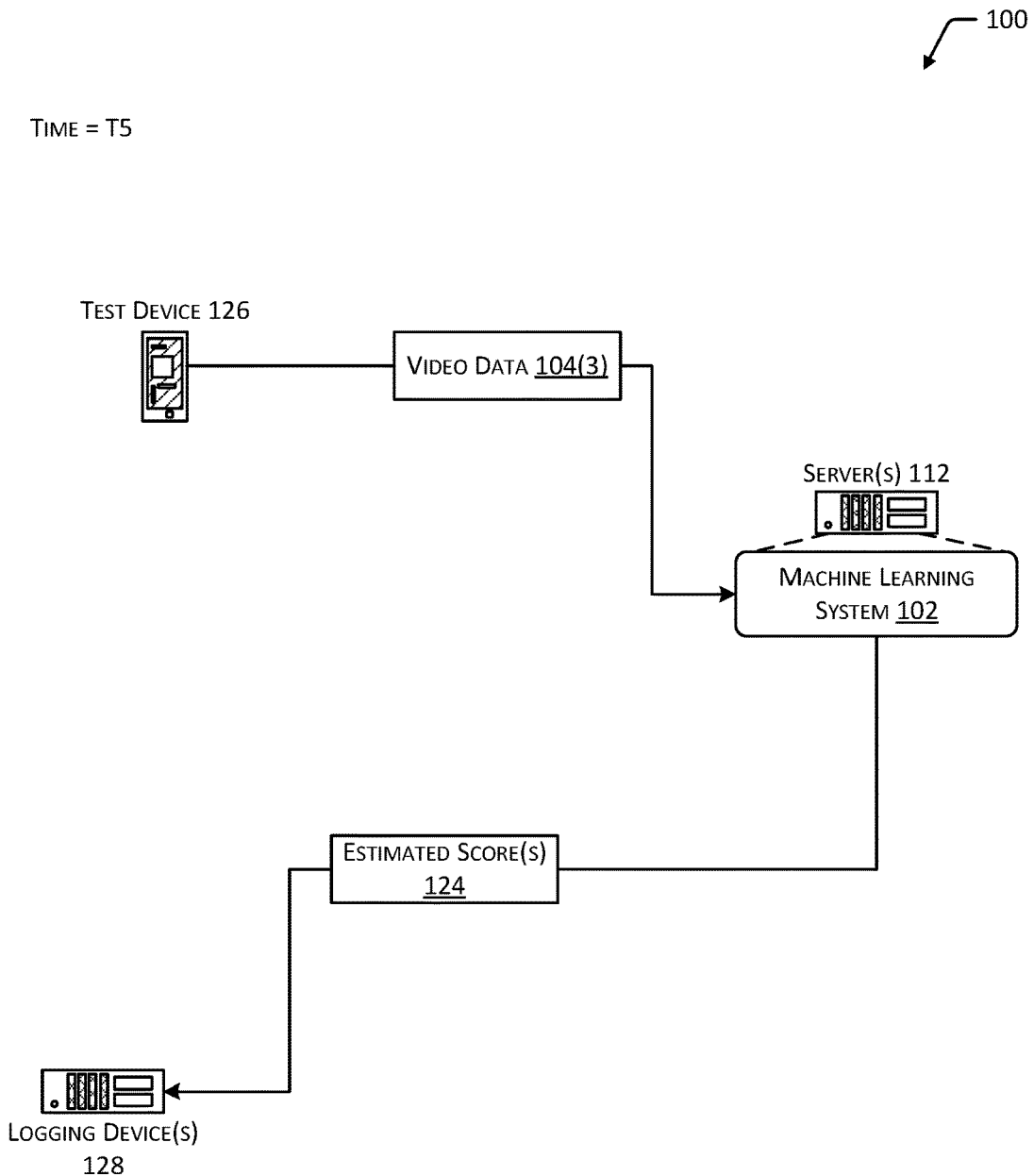
FIG. 1B depicts an implementation of a process for determining an estimated score for video data using a machine learning system.

For example, FIG. 1B depicts an implementation of a process for determining an estimated score 124 for video data 104 using a machine learning system 102. At a fifth time T5, after the machine learning system 102 has been trained using the training data 122, a test device 126 may provide subsequent video data 104(3) to the server(s) 112. For example, the test device 126 may execute an application for the purpose of testing the application or for another purpose. A test device 126 may include any type of computing device including, without limitation, the types of computing devices described with regard to the user device 110 and the server(s) 112. For example, FIG. 1B depicts the test device 126 as a commodity cellphone. Execution of the application may cause generation of video data 104 or presentation of video output 116. The machine learning system 102 may determine one or more estimated scores 124 based on the video characteristics 120 of the video data 104(3) and provide data indicative of the estimated score(s) 124 to one or more logging devices 128 that maintain information regarding execution of an application. In other implementations, the estimated score(s) 124 may be provided the test device 126 or to one or more other computing devices.

Figure 1C:
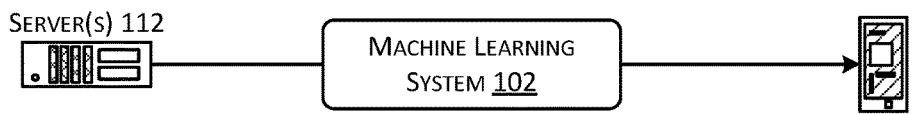
FIG. 1C depicts an implementation of a process for determining an estimated score for video data using a machine learning system.
Figure 1C:
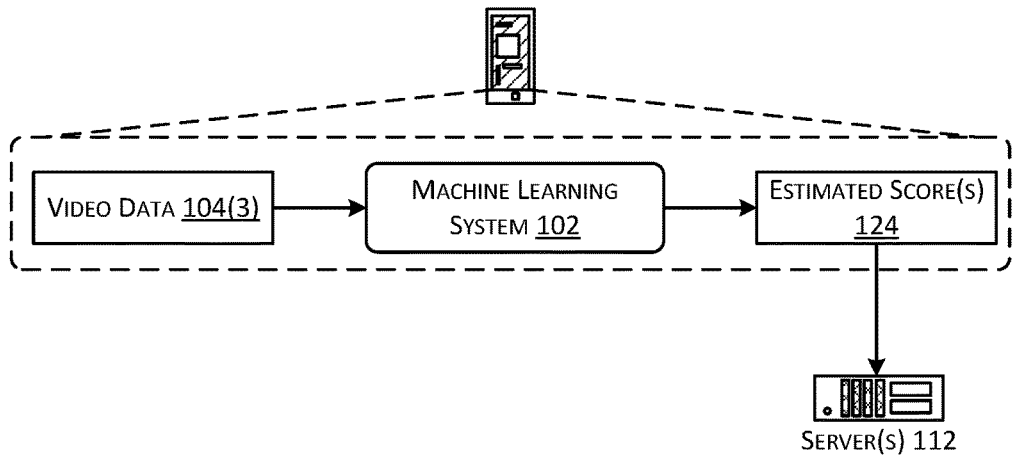

In other cases, functionality of the machine learning system 102 may be deployed to one or more other devices, such as by incorporating the machine learning system 102 within a software development kit (SDK). For example, FIG. 1C depicts an implementation of a process for determining an estimated score 124 for video data 104 using a machine learning system 102. At a fifth time T5, after the machine learning system 102 has been trained using the training data 122, an SDK or other data incorporating at least a portion of the functionality of the machine learning system 102 may be provided to a test device 126. The test device 126 may store video data 104(3) or may generate video data 104(3) based on execution of an application. At a sixth time T6, the machine learning system 102 executing on the test device 126 may determine one or more estimated scores 124 based on the video characteristics 120 of the video data 104(3). In some implementations, data indicative of the estimated score(s) 124 may be transmitted to the server(s) 112, or to one or more other computing devices, such as logging devices 128 (shown in FIG. 1B). Local generation of estimated scores 124 by a test device 126 may enable the quality of video output 116 to be determined without transmitting the video data 104(3) to other devices, which may preserve the privacy of the video data 104(3), privacy of user data associated with a user 108 of the test device 126, privacy of other data associated with an application executing on the test device 126, and so forth.

One type of machine learning system 102 that may be used to determine quality scores 106 is a convolutional neural network (CNN). A CNN may apply a set of filters to each frame of video data 104 in various combinations to determine video characteristics 120. In some cases, the video characteristics 120 determined by a CNN may not be understandable to human users 108. A tree-based algorithm may be used to map a set of video characteristics 120 to a quality score 106. Tree-based algorithms may capture non-linear relationships that exist in sets of data, which may be used to map abstract representations of video data 104, such as a set of video characteristics 120 determined by a CNN, to quality scores 106 provided by users 108. In some implementations, data from the machine learning system 102 may be used to generate an output that includes an estimated mean quality score 106 for each frame of a video clip. The output may be provided to the test device 126 or to one or more other computing devices. The quality score 106 for a particular frame may be determined based on the characteristics of the frame itself, as well as an aggregated set of frames before and after the particular frame.

By use of consistency metrics 114 to account for biases and other characteristics of particular users 108 and in some implementations, by presenting users 108 with videos that the users 108 have previously viewed to estimate self-accuracy of the user 108, confidence in the accuracy of the quality scores 106 received from users 108 may be increased. As a result, confidence in the accuracy of the quality scores 106 determined using the trained machine learning system 102 may be increased. In some implementations, while the quality scores 106 input by users 108 may include integers, a quality score 106 determined by the machine learning system 102 may include any number. For example, an output generated based on the machine learning system 102 may indicate an estimated average quality score 106 for a frame of video data 104, which may include a non-integer. Use of a machine learning system 102 to estimate a quality score 106 for video data 104 may enable a computing device to estimate the manner in which a human would perceive the quality of video output 116 without requiring access to source content or a reference video.

Figure 2:
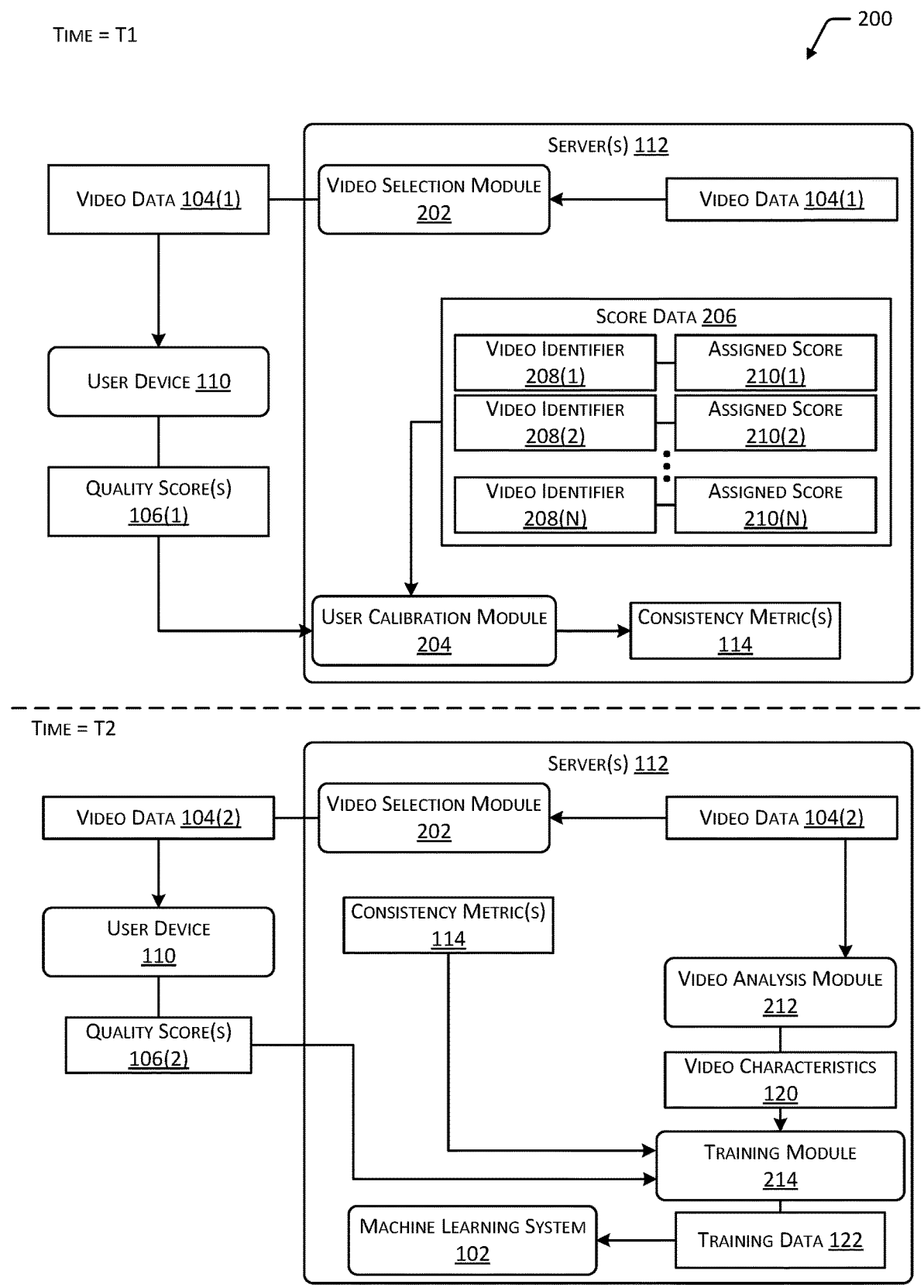
FIG. 2 depicts an implementation of a system for training a machine learning system based on characteristics of video data and quality scores input by a user.

FIG. 2 depicts an implementation of a system 200 for training a machine learning system 102 based on characteristics of video data 104 and quality scores 106 input by a user 108. At a first time T1, one or more consistency metric(s) 114 associated with a user 108 or user device 110 may be determined. A first set of video data 104(1) may be provided to a user device 110. A video selection module 202 associated with one or more server(s) 112 may determine the first set of video data 104(1), such as by selecting one or more video clips from a library or other body of video data 104. In some implementations, the video selection module 202 may access one or more rules or criteria for selection of video clips. For example, a set of rules or criteria may indicate that the first set of video data 104(1) is to include thirty video clips that are each associated with a known or accepted quality score 106, no more than one video clip may be associated with the same source video, and the selected video clips are to include an even distribution among possible values for the known or accepted quality score 106. In some cases, rules or criteria may indicate particular content types or video characteristics 120 of the first set of video data 104(1), or may indicate that the video clips are to include an even distribution among a set of possible content types or video characteristics 120. In other implementations, the video selection module 202 may be associated with the user device 110, which may request the video data 104(1) from the server(s) 112 or another source based on the video clips selected by the video selection module 202. In still other implementations, the user device 110 or another computing device in communication with the user device 110 may store the video data 104(1).

One or more quality score(s) 106(1) may be received from the user device 110 in response to the first set of video data 104(1). For example, a user 108 may input a quality score 106(1) for each video clip included in the first set of video data 104(1). A user calibration module 204 associated with the server(s) 112 may determine one or more consistency metrics 114 for the user 108 based on a difference between the quality score(s) 106(1) received from the user device 110 and the known or accepted quality scores 106 for the first set of video data 104(1). For example, the user calibration module 204 may access score data 206 that associates a video identifier 208 for each video clip with an assigned score 210. Continuing the example, FIG. 2 depicts the score data 206 associating a first video identifier 208(1) indicative of a first video clip of the first video data 104(1) with a first assigned score 210(1). The first assigned score 210(1) may be indicative of a quality of the first video clip, which may be assigned by an administrator, expert, content curator, and so forth, or may be determined based on at least a threshold quantity or percentage of users 108 providing the same quality score 106 in response to the video clip. Similarly, the score data 206 may associate a second video identifier 208(2) with a second assigned score 210(2), and any number of additional video identifiers 208(N) with any number of additional assigned scores 210(N).

As described with regard to FIG. 1, the consistency metric(s) 114 may be used to determine the manner in which quality scores 106 are used to train the machine learning system 102. For example, a consistency metric 114 may be used to determine a confidence in the quality scores 106 received from a user 108 and the extent to which the quality scores 106 from the user 108 influence the training of the machine learning system 102. In some implementations, the user calibration module 204 may also determine one or more corrective values that may be added to or subtracted from subsequent quality scores 106 provided by a user 108, a multiplier that is applied to subsequent quality scores 106, or both a multiplier and an added or subtracted value. For example, a subsequent quality score 106 of a user 108 may be modified using a corrective value based on a relationship between the quality scores 106(1) received from the user 108 and the assigned scores for the first video data 104(1) indicated in the score data 206. In some implementations, the user calibration module 204 may also access user data indicative of one or more characteristics of a user 108 or user account, such as a location of a user 108, or may provide a request to the user device 110 to determine this information. In other implementations, the user calibration module 204 may access device data indicative of one or more characteristics of the user device 110, may determine the characteristics of the user device 110 based on communications with the user device 110, or may provide a request to the user device 110 to determine this information. In some cases, the consistency metrics(s) 114 or a determined corrective value may be influenced by one or more characteristics of the user 108 or the characteristics of the user device 110.

At a second time T2, the consistency metric(s) 114 determined at the first time T1 may be used to determine the manner in which additional quality score(s) 106(2) received from a user device 110 are used to generate training data 122 to train a machine learning system 102. A second set of video data 104(2) may be provided to the user device 110. The video selection module 202 may determine a set of video clips to be included in the second set of video data 104(2). In some implementations, the video selection module 202 may access one or more rules or criteria to determine the second video data 104(2). For example, a set of rules or criteria may indicate that the second set of video data 104(2) is to include thirty video clips, in which three video clips are to be associated with a known or accepted quality score 106, three video clips are to be video clips that have been previously viewed by the user 108, and twenty-four video clips are to be video clips that have not been previously viewed by the user 108. Rules and criteria may also indicate that the selected video clips are to include an even distribution among a set of possible content types or video characteristics 120. In some implementations, rules or criteria may indicate a minimum length of a video clip, such as five seconds. Rules or criteria may also indicate particular sources of video clips. For example, a rule may indicate that no more than a single video clip from a single source video may be included in the second video data 104(2). As another example, a rule may indicate that multiple video clips from a single source video may be included in the second video data 104(2), however, the multiple video clips may not include any common frames. As yet another example, a rule may indicate that multiple video clips from a single source video may be included in the second video data 104(2), and that the video clips may include a maximum number of common (e.g., overlapping) frames. Continuing the example, if a particular error, network condition, or application activity is determined to occur at a specific time, multiple video clips having frames that overlap that event may be selected.

Portions of the second video data 104(2) that are associated with known or accepted quality scores 106 or that have been previously viewed by the user 108 may be used to determine one or more new consistency metrics 114 or modify one or more existing consistency metrics 114. For example, the user calibration module 204 may receive quality scores 106(2) from the user device 110 for video clips associated with an assigned quality score 106 and determine a difference between the received quality score 106(2) and the assigned quality score 106. The user calibration module 204 may also receive quality scores 106(2) from the user device 110 for a video clip that has been previously viewed by the user 108 and determine a difference between a received quality score 106(2) and a quality score 106 previously provided by the user 108. Portions of the second video data 104(2) that are not associated with assigned quality scores 106 or that have not been previously viewed by the user 108 may be used to generate training data 122 to train a machine learning system 102.

A video analysis module 212 may determine one or more video characteristics 120 of the second video data 104(2) that was provided to the user device 110. In some implementations, the video analysis module 212 may be associated with the machine learning system 102. For example, the machine learning system 102 may include a CNN, which may apply a set of filters to the second video data 104(2), in various combinations, to determine video characteristics 120. In some cases, the video characteristics 120 determined by a machine learning system 102, such as a CNN, may not be understandable to human users 108. In some implementations, the video analysis module 212 may determine one or more vectors or an embedding representative of the video characteristics 120 based on the second video data 104(2). Based on the determined vectors or embedding, other values, such as mean values, minimum values, maximum values, and standard deviations for one or more video characteristics 120 may be determined. In other implementations, the video characteristics 120 may include predetermined values for one or more video characteristics 120, such as an indication of blurriness, brightness, contrast, and so forth for a video clip, and use of a video analysis module 212 to determine the video characteristics 120 may be omitted. In still other implementations, the video characteristics 120 may include a combination of predetermined characteristics 120 and characteristics that are determined using the video analysis module 212.

A training module 214, which in some implementations may be associated with a machine learning system 102, may use the quality scores 106(2), consistency metric(s) 114, and the video characteristics 120 for the corresponding video data 104(2) to generate training data 122 that may be used to train the machine learning system 102. At a subsequent time, the machine learning system 102 may be used to evaluate the quality of subsequent video data 104. For example, the machine learning system 102 may determine the video characteristics 120 of at least a portion of the subsequent video data 104, then determine an estimated score 124 for one or more frames of the subsequent video data 104 based on the video characteristics 120. In some implementations, an output may be generated based on data from the machine learning system 102. For example, the output may associate an estimated score 12 for one or more frames of subsequent video data 104 with an indication of particular video characteristics 120 of the frame or an indication of a particular network, application, or device characteristics associated with the frame. Continuing the example, an indication of video characteristics 120 or network characteristics may represent a possible reason associated with an estimated score 124 that is below a threshold value.

While FIG. 2 depicts the generation of training data 122 based on consistency metrics 114, quality scores 106(2), and video characteristics 120, in other implementations, the training data 122 may be based on the received quality scores 106(2) and video characteristics 120, and generation of a consistency metric 114 may be omitted. For example, data indicative of a user 108 or user device 110 from which the quality scores 106(2) were received, the quality scores 106(2) themselves, and the video characteristics 120 may be used as inputs to generate training data 122. Based on quality scores 106 received from a particular user 108 or user device 110 over time, the machine learning system 102 may determine particular weights that may affect the manner in which quality scores from the user 108 or user device 110 influence generation of an output.

Figure 3:
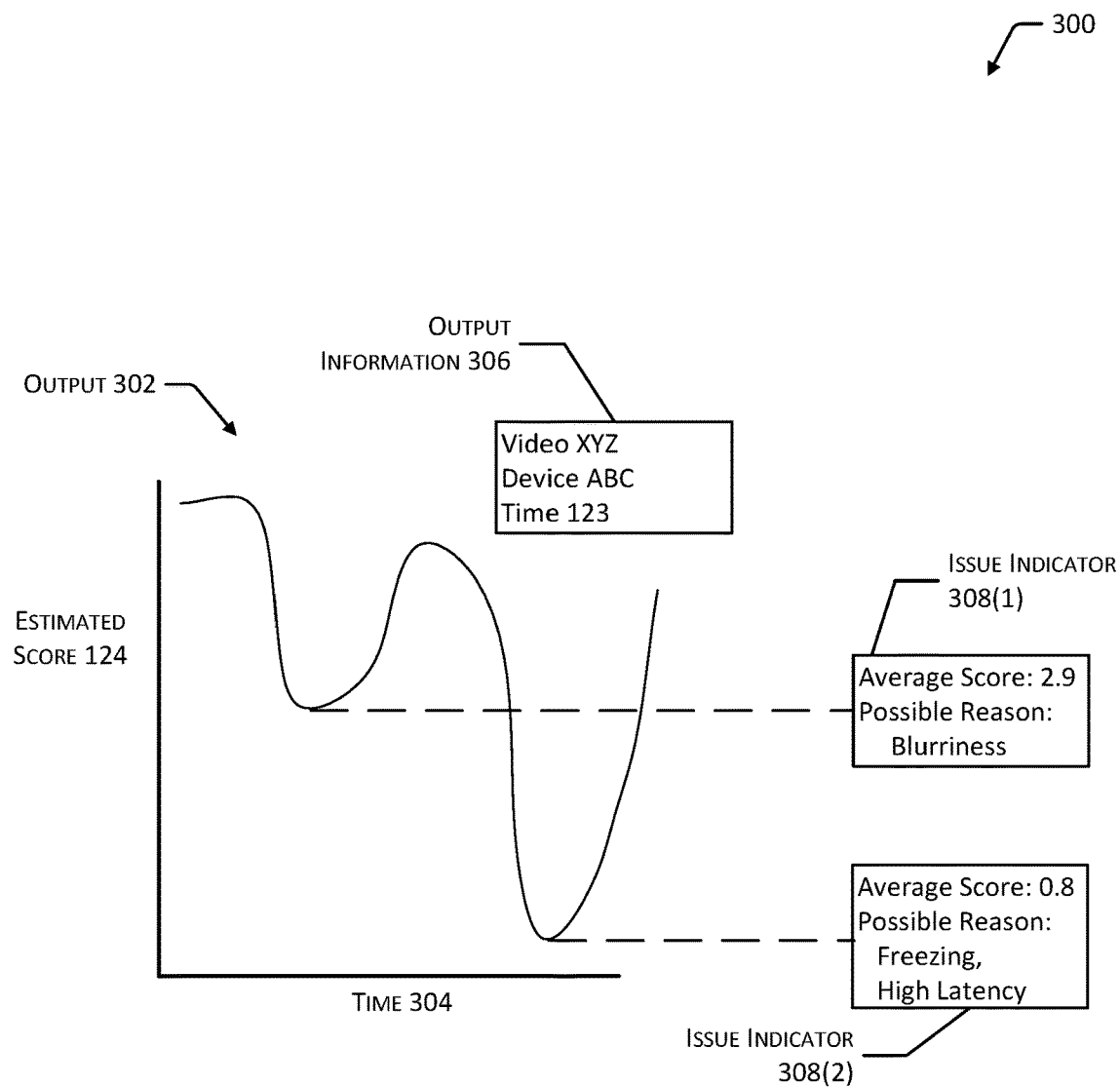
FIG. 3 is a diagram depicting an implementation of an example output that may be generated using a trained machine learning system.

FIG. 3 is a diagram 300 depicting an implementation of an example output 302 that may be generated using a trained machine learning system 102. As described with regard to FIGS. 1 and 2, a machine learning system 102 may be trained by using quality scores 106 received from user devices 110 and video characteristics 120 of video data 104 that was provided to the user devices 110 to generate training data 122. At a subsequent time, the machine learning system 102 may process the video data 104 and determine an estimated score 124 for the video data 104 based on the video characteristics 120 of the video data 104. In some implementations, the machine learning system 102 may present a video using a display and use computer vision techniques to analyze video output 116 associated with the video data 104. In other implementations, the machine learning system 102 may analyze the video data 104 without causing presentation of a video. In some implementations, the machine learning system 102 may determine an estimated score 124 for each frame of a video. For example, FIG. 3 depicts an output 302 that includes a graph in which a position of a line along a first axis represents an estimated score 124 for a frame of a video, while a position of the line along a second axis represents a time 304 associated with the frame of the video.

The estimated score 124 for a particular frame of video data 104 may be determined based on the video characteristics 120 of that frame of video data 104. For example, the blurriness, blockiness, frame rate, brightness, contrast, and so forth for the frame of video data 104 may influence the estimated score 124 for that frame that is determined by the machine learning system 102. The estimated score 124 for the particular frame may also be determined based on video characteristics 120 of one or more frames of the video data 104 that occur before the particular frame, after the particular frame, or both before and after the particular frame. For example, a change in frame rate across multiple frames before and after the particular frame may influence the estimated score 124 for the particular frame. Variation between a set of multiple frames may also be used to determine whether presentation of a video has frozen. For example, if a threshold number of frames include an image that is within a threshold level of similarity, this may indicate that the presented content does not change or changes only slightly across the threshold number of frames.

In some implementations, the output 302 may include output information 306, which may include an identifier associated with the video data 104, a device presenting the video data 104, a time at which the video data 104 was presented, and so forth. The output 302 may also include one or more issue indicators 308. In some implementations, an issue indicator 308 may be generated or presented in response to an estimated score 124 for a frame of video data 104 that is less than a threshold value. In other implementations, an issue indicator 308 may be generated in response to user input selecting a portion of the output 302. In still other implementations, an issue indicator 308 may be generated for each frame of video data 104 and presented in response to user input selecting a portion of the output 302. An issue indicator 308 may represent a time at which a particular video characteristic 120, network condition, device characteristic, or activity of an application may have caused a particular estimated score 124. For example, FIG. 3 depicts a first issue indicator 308(1) that indicates an average estimated score 124 of "2.9" and a particular video characteristic 120 (e.g., "Blurriness") that may have influenced the average estimated score 124. FIG. 3 depicts a second issue indicator 308(2) that indicates an average estimated score 124 of "0.8", a particular video characteristic 120 (e.g., "Freezing"), and a particular network characteristic (e.g., "High Latency") that may have influenced the estimated score 124. Output 302 that associates estimated scores 124 with potential characteristics that may have influenced the estimated scores 124 may be used to improve operation of applications, determine appropriate networks and devices for use, and so forth.

Figure 4:
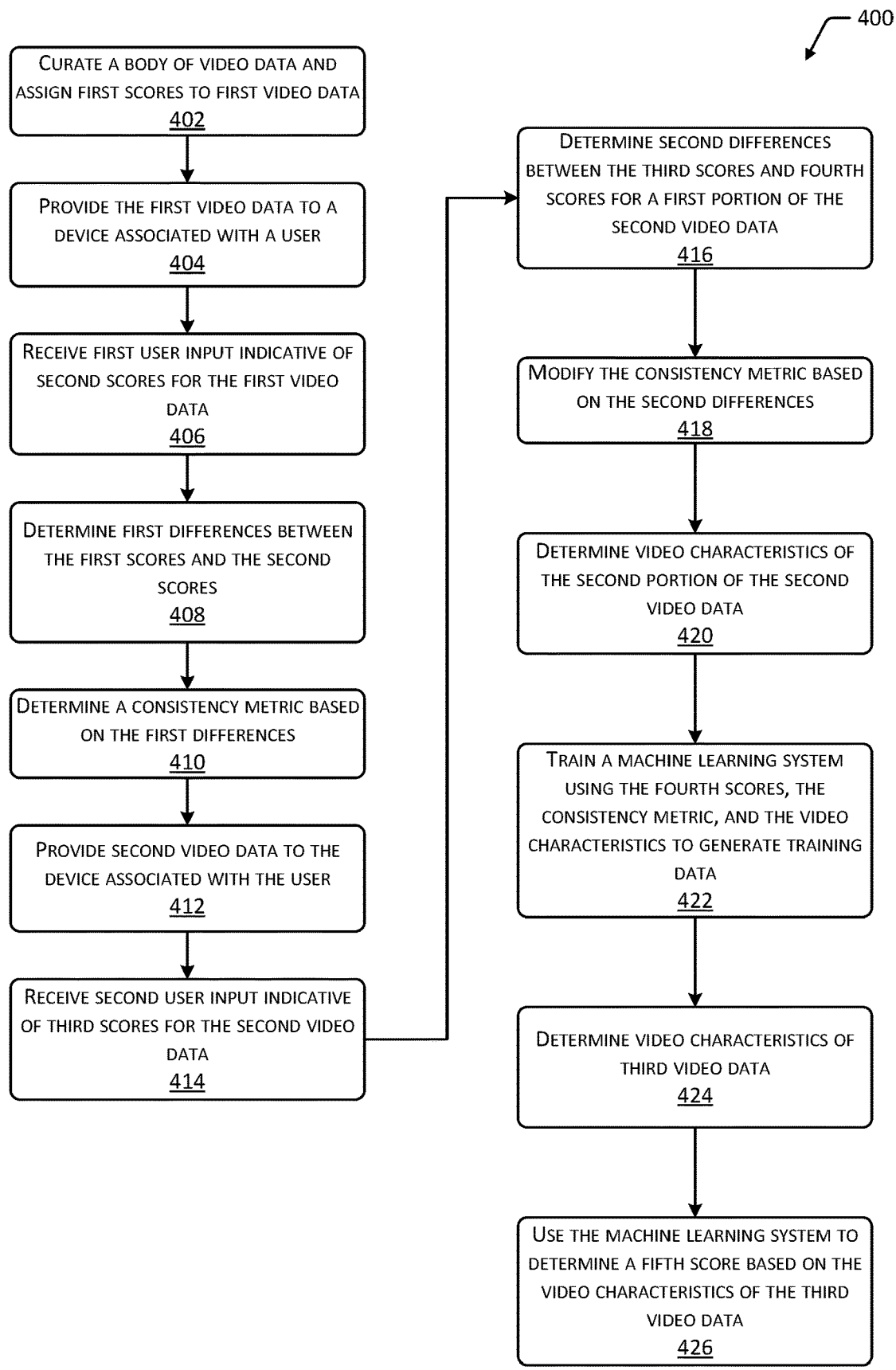
FIG. 4 is a flow diagram depicting an implementation of a method for training a machine learning system based on characteristics of video data and quality scores input by a user and generating an output using the machine learning system.

FIG. 4 is a flow diagram 400 depicting an implementation of a method for training a machine learning system 102 based on characteristics of video data 104 and quality scores 106 input by a user 108 and generating an output 302 using the machine learning system 102.

At 402, a body of video data may be curated, and first scores may be assigned to first video data 104(1). For example, the first video data 104(1) may include one or more video clips, and a quality score 106 may be assigned to each video clip. The video clips included in the first video data 104(1) may be selected in a manner that allows for diverse types of video content, such as different resolutions, frame rates, content types, live and non-live sources, content associated with optimal and sub-optimal network conditions, content associated with presentation using different types of devices or viewing modes, and so forth. Each video clip may be associated with a known quality score 106. In some implementations, a quality score 106 may be assigned to a video clip by an administrator, expert, content curator, or other individual. In other implementations, a quality score 106 may be associated with a video clip if a threshold number or threshold percentage of users 108 that have evaluated the video clip provide the same quality score 106.

At 404, the first video data 104(1) may be provided to a device associated with a user 108. As described with regard to FIG. 2, the first video data 104(1) may include one or more video clips. The one or more video clips may be selected from a library or other body of video data 104 randomly or based on one or more rules or criteria for selection of video clips. For example, a set of rules or criteria may indicate that the first set of video clips is to include a selected number of video clips, such as thirty. The rules or criteria may indicate that no more than one video clip may be associated with the same source video. The rules or criteria may also indicate that the selected video clips are to include an even distribution among possible values for the known or accepted quality score 106. In some cases, the rules or criteria may indicate particular content types or video characteristics 120 that are to be included in the first set of video clips, or may indicate that the video clips are to include an even distribution among a set of possible content types or video characteristics 120.

At 406, first user input indicative of second scores for the first video data 104(1) may be received. For example, the user input may indicate a quality score 106 for each of the video clips in the first set. Each video clip may be presented as video output 116 on a user device 110. During or after presentation of the video output 116, a user interface may be presented through which a user 108 may input a quality score 106 indicative of a perceived quality of the video output 116. In some implementations, the quality score 106 may include an integer, such as a number ranging from zero to four or from one to five, with greater values representing a higher perceived quality of the video output 116.

At 408, first differences between the first scores and the second scores may be determined. For example, differences may be determined between the user input quality score 106 and the corresponding assigned quality score 106 for each video clip of the first video data 104(1). Continuing the example, a user input quality score 106 may be greater than or less than the assigned quality score 106 for a particular video clip. The difference between the user input quality score 106 and the assigned quality score 106 may indicate a tendency of a particular user 108 to perceive particular types of content or content of a particular quality as having greater or less quality than a quality indicated by the assigned quality score 106. For example, a particular user 108 may be subject to a bias regarding particular content types, have a higher tolerance for blurry content and a lower tolerance for video output 116 that freezes, and so forth.

At 410, a consistency metric 114 may be determined based on the first differences. For example, one or more consistency metrics 114 may be determined based on the differences between the user input quality scores 106 and the assigned quality scores 106 for the first set of video clips. In some implementations, if the differences between the accepted quality scores 106 for the video clips and the user input quality scores 106 are greater than a threshold value or are inconsistent, future quality scores 106 from the user 108 may be disregarded, or the determined consistency metric 114 may cause quality scores 106 from the user 108 to have no influence or very little influence on the training of a machine learning system 102. In some implementations, a consistency metric 114 may include a corrective value that may be added to or subtracted from subsequent quality scores 106 or a multiplier by which subsequent quality scores 106 associated with the user 108 are multiplied. In some implementations, multiple consistency metrics 114 may be determined for a user 108. For example, a user 108 may exhibit a tendency to consistently provide quality scores 106 greater than the accepted quality score 106 for a first type of content, less than the accepted quality score 106 for a second type of content, and provide inconsistent quality scores 106 for a third type of content. In some implementations, the consistency metric(s) 114 may also be determined based in part on characteristics of the user 108, such as a location, or characteristics of the user device 110, such as a type or size of a display.

At 412, second video data 104(2) may be provided to the device associated with the user 108. The second video data 104(2) may include a set of video clips that are selected to provide to a user device 110. In some implementations, a first portion of the second set may be associated with an assigned quality score 106. A second portion of the second set may include video clips that have been previously provided to the user device 110. A third portion of the second set may include video clips that are not associated with an assigned quality score 106 and have not been previously provided to the user device 110. For example, as described with regard to FIG. 2, one or more rules or criteria may be used to determine a second set of video clips. The rules or criteria may indicate that the second set of video clips is to include a selected number of video clips, such as thirty. The rules or criteria may also indicate the sizes of the first, second, and third portions of the second set of video clips. For example, the rules or criteria may indicate that three video clips are to be associated with a known or accepted quality score 106, three video clips are to be video clips that have been previously viewed by the user 108, and twenty-four video clips are to be video clips that have not been previously viewed by the user 108. In some cases, the rules and criteria may also indicate that the selected video clips are to include an even distribution among a set of possible content types or video characteristics 120.

At 414, second user input indicative of third scores for the second video data 104(2) may be received. The second user input may include a quality score 106 for each of the video clips in the second set. For example, each video clip may be used to cause presentation of the video output 116, and a user 108 may input a quality score 106 indicative of the perceived quality of the video output 116 during or after presentation of the video output 116.

At 416, second differences between the third scores and fourth scores for a first portion of the second video data 104(2) may be determined. For example, differences between user input quality scores 106 and the assigned quality scores 106 for the first portion of the video clips of the second of video data 104(2) may be determined. Additionally, differences between current user input quality scores 106 and previous user input quality scores 106 for the second portion of the video clips for the second video data 104(2) may also be determined. For example, the first portion of the video clips may be used to further modify the consistency metric(s) 114 for a user 108 based on differences between user input quality scores 106 and accepted quality scores 106. The second portion of the video clips may be used to modify the consistency metric(s) 114 based on consistency between previously input quality scores 106 and current quality scores 106 provided by the user 108. For example, if a user 108 exhibits a tendency to provide inconsistent quality scores 106 for a particular type of content, a consistency metric 114 may be used to prevent or limit the influence of the quality scores 106 from the user 108 for that type of content on training of a machine learning system 102.

At 418, the consistency metric(s) 114 may be modified based on the second differences. For example, differences between user input quality scores 106 and the accepted quality scores 106, and between user input quality scores 106 and the previous user input quality scores 106 may be used to change or replace one or more consistency metrics 114. Modification of the consistency metric(s) 114 may include generating of one or more additional consistency metrics 114, removing one or more existing consistency metrics 114, replacing an existing consistency metric 114 with a new consistency metric 114, and so forth.

At 420, the video characteristics 120 of the second portion of the second video data 104(2) are determined. As described with regard to FIG. 2, in some implementations, the video characteristics 120 may be determined using a machine learning system 102. For example, a machine learning system 102 may include a CNN, which may apply different combinations of a set of filters to the video clips to determine a vector or embedding based on the video clips. In some cases, the video characteristics 120 determined by a machine learning system 102 may not be understandable to human users 108. In other implementations, the video characteristics 120 may include predetermined values for one or more video characteristics 120, such as an existing value for frame rate, brightness, contrast, and so forth.

At 422, a machine learning system 102 may be trained using the fourth scores, the consistency metric(s) 114, and the video characteristics 120 to generate training data 122. For example, the consistency metric(s) 114 may determine the extent to which the fourth scores influence the training of the machine learning system 102. In some cases, different consistency metrics 114 may be associated with different scores. As a result, a particular score may influence the machine learning system 102 differently than another score. Using the training data 122, the machine learning system 102 may be trained to process subsequent video data 104, and based on the video characteristics 120 of the subsequent video data 104, to determine an estimated score 124 for at least a portion of the subsequent video data 104. In some implementations, the machine learning system 102 may use a tree-based algorithm to map a set of video characteristics 120 to determine an estimated score 124. Tree-based algorithms may capture non-linear relationships that exist in sets of data, which may map abstract representations of video data 104, such as a set of video characteristics 120 determined by the machine learning system 102, to quality scores 106 provided by users 108.

At 424, video characteristics 120 of third video data 104(3) may be determined. For example, a video may be processed using the machine learning system 102 to determine the video characteristics 120 of the video. The machine learning system 102 may use a variety of computer vision algorithms, segmentation algorithms, object recognition algorithms, and so forth, and may apply a variety of filters in various combinations to determine the video characteristics 120 of the video. In some implementations, the video characteristics 120 may be represented as an embedding or vector.

At 426, the machine learning system 102 may be used to determine a fifth score based on the video characteristics 120 of the third video data 104(3). For example, based on data from the machine learning system 102, an output 302 may be generated that indicates estimated scores 124 for the video based on the determined video characteristics 120. The machine learning system 102 may map sets of video characteristics 120 to an estimated score 124 that represents a quality of a portion of the video as it may be perceived by a human user 108. As described with regard to FIG. 3, in some implementations, the output 302 may include an estimated score 124 for each frame of a video. For example, each frame of a video may be associated with different video characteristics 120, and as a result, the estimated score 124 for the video may vary in different frames. In some cases, the estimated score 124 for a particular frame may be determined based on the video characteristics 120 of one or more frames before or after the particular frame. For example, a variation in a video characteristic 120 across multiple frames may be determined by examining a particular frame and one or more adjacent frames, which may influence the estimated score 124 for the particular frame.

Figure 5:
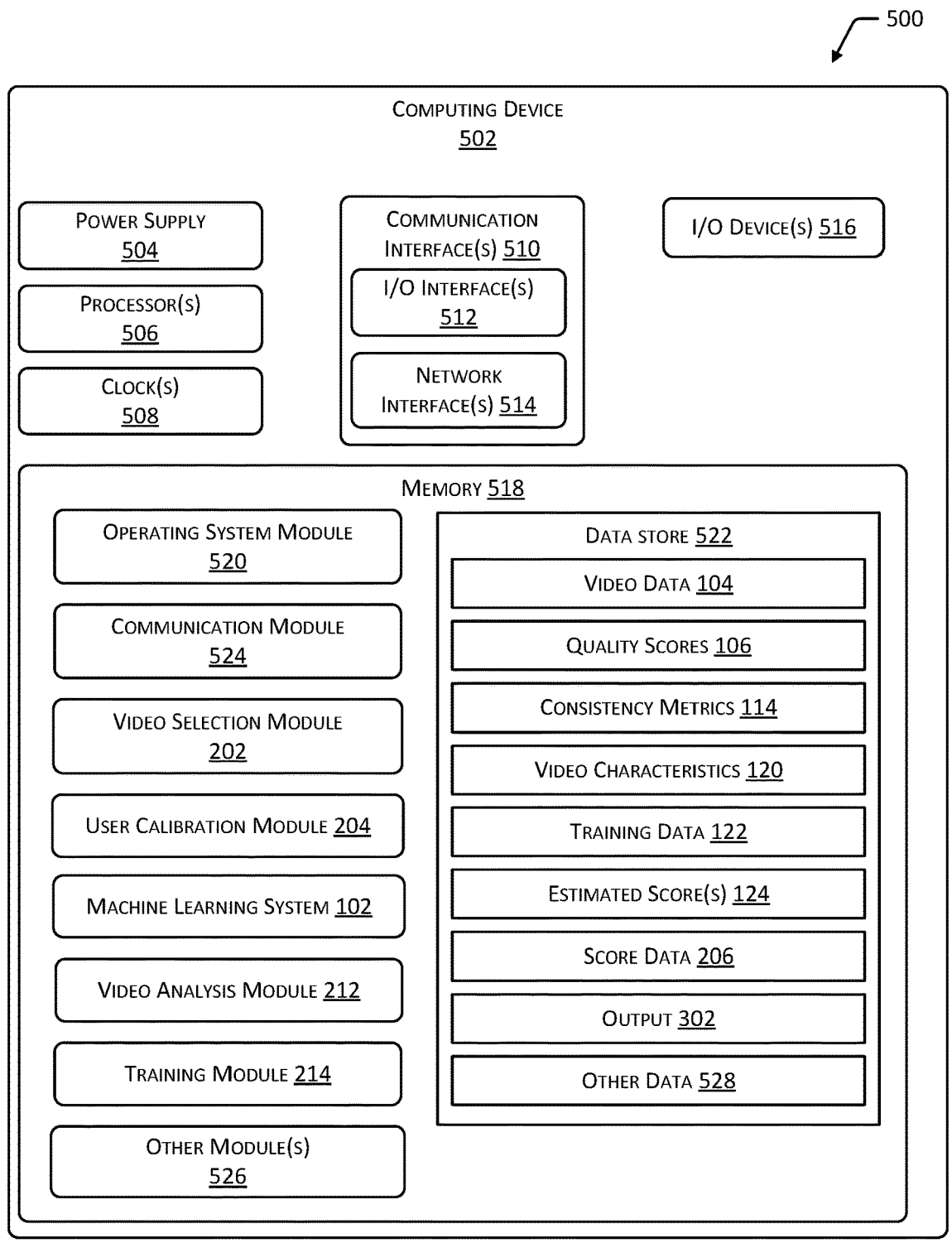
FIG. 5 is a block diagram depicting an implementation of a computing device within the present disclosure.

FIG. 5 is a block diagram 500 depicting an implementation of a computing device 502 within the present disclosure. The computing device 502 may include one or more servers 112, one or more user devices 110, or any other computing device 502 in communication with a user device 110. Additionally, while FIG. 5 depicts a single block diagram 500 of a computing device 502, any number and any type of computing devices 502 may be used to perform the functions described herein. For example, a portion of the functions described herein may be performed by one or more servers 112, while other functions may be performed by one or more user devices 110.

One or more power supplies 504 may be configured to provide electrical power suitable for operating the components of the computing device 502. In some implementations, the power supply 504 may include a rechargeable battery, fuel cell, photovoltaic cell, power conditioning circuitry, and so forth.

The computing device 502 may include one or more hardware processor(s) 506 (processors) configured to execute one or more stored instructions. The processor(s) 506 may include one or more cores. One or more clock(s) 508 may provide information indicative of date, time, ticks, and so forth. For example, the processor(s) 506 may use data from the clock 508 to generate a timestamp, trigger a preprogrammed action, and so forth.

The computing device 502 may include one or more communication interfaces 510, such as input/output (I/O) interfaces 512, network interfaces 514, and so forth. The communication interfaces 510 may enable the computing device 502, or components of the computing device 502, to communicate with other computing devices 502 or components of the other computing devices 502. The I/O interfaces 510 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 512 may couple to one or more I/O devices 516. The I/O devices 516 may include any manner of input devices or output devices associated with the computing device 502. For example, I/O devices 516 may include touch sensors, displays, touch sensors integrated with displays (e.g., touchscreen displays), keyboards, mouse devices, microphones, image sensors, cameras, scanners, speakers or other types of audio output devices, haptic devices, printers, and so forth. In some implementations, the I/O devices 516 may be physically incorporated with the computing device 502. In other implementations, I/O devices 516 may be externally placed.

The network interfaces 514 may be configured to provide communications between the computing device 502 and other devices, such as the I/O devices 516, routers, access points, and so forth. The network interfaces 514 may include devices configured to couple to one or more networks including local area networks (LANs), wireless LANs (WLANs), wide area networks (WANs), wireless WANs, and so forth. For example, the network interfaces 514 may include devices compatible with Ethernet, Wi-Fi, Bluetooth, ZigBee, Z-Wave, 3G, 4G, 5G, LTE, and so forth.

The computing device 502 may include one or more busses or other internal communications hardware or software that allows for the transfer of data between the various modules and components of the computing device 502.

As shown in FIG. 5, the computing device 502 may include one or more memories 518. The memory 518 may include one or more computer-readable storage media (CRSM). The CRSM may be any one or more of an electronic storage medium, a magnetic storage medium, an optical storage medium, a quantum storage medium, a mechanical computer storage medium, and so forth. The memory 518 may provide storage of computer-readable instructions, data structures, program modules, and other data for the operation of the computing device 502. A few example modules are shown stored in the memory 518, although the same functionality may alternatively be implemented in hardware, firmware, or as a system on a chip (SoC). In some implementations, the functionality described with regard to one or more of the modules may be incorporated within a software development kit (SDK). For example, the functionality of a machine learning system 102 may be deployed to a user device 110 as an SDK to enable the user device 110 to analyze video data 104 and determine an estimated score 124 for the video data 104 without transmitting the video data 104 to other computing devices 502.

The memory 518 may include one or more operating system (OS) modules 520. The OS module 520 may be configured to manage hardware resource devices such as the I/O interfaces 512, the network interfaces 514, the I/O devices 516, and to provide various services to applications or modules executing on the processors 506. The OS module 520 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

One or more data stores 522 and one or more of the following modules may also be associated with the memory 518. The modules may be executed as foreground applications, background tasks, daemons, and so forth. The data store(s) 522 may use a flat file, database, linked list, tree, executable code, script, or other data structure to store information. In some implementations, the data store(s) 522 or a portion of the data store(s) 522 may be distributed across one or more other devices including other computing devices 502, network attached storage devices, and so forth.

A communication module 524 may be configured to establish communications with one or more other computing devices 502. Communications may be authenticated, encrypted, and so forth.

The memory 518 may also store the video selection module 202. The video selection module 202 may determine video data 104 to be presented. In some implementations, the video selection module 202 may determine one or more video clips to be presented randomly or in a pseudo-random manner. In other implementations, the video selection module 202 may determine one or more rules or criteria for selection of video clips. For example, a set of rules may control a number of video clips presented in a single viewing session, the types of content or other video characteristics 120 of the video clips, the sources of the video clips, an assigned quality score 106 of the video clips, and so forth.

The memory 518 may also store the user calibration module 204. The user calibration module 204 may determine one or more consistency metrics 114 for a user 108, user device 110, or user account. Consistency metrics 114 may be determined based in part on differences between quality scores 106 received from user input and accepted quality scores 106 of video data 104. In other implementations, consistency metrics 114 may be determined based in part on differences between quality scores 106 received from current user input and quality scores 106 received from previous user input. In still other implementations, consistency metrics 114 may be determined based in part on user data indicative of one or more characteristics of a user 108, device data indicative of one or more characteristics of a user device 110, network data indicative of one or more characteristics of a network used to send video data 104, application data indicative of one or more characteristics of an application causing presentation of the video data 104, and so forth.

The memory 518 may store the video analysis module 212. The video analysis module 212 may determine video characteristics 120 of video data 104. In some implementations, the video analysis module 212 may be associated with a machine learning system 102, such as a CNN. For example, the video analysis module 212 may determine video characteristics 120 by applying filters to the video data 104, in various combinations. In some implementations, the video analysis module 212 may determine a vector or embedding representing the determined video characteristics 120. In other implementations, the video characteristics 120 may include one or more predetermined values, and the video analysis module 212 may determine the video characteristics 120 by accessing the predetermined values.

The memory may also store the training module 214. In some implementations, the training module 214 may be associated with a machine learning system 102 and may use user input quality scores 106, consistency metrics 114, and video characteristics 120 of video data 104 to generate training data 122 to train the machine learning system 102.

Based on the determined video characteristics 120 of video data 104, the machine learning system 102 may then determine estimated scores 124 for the video data 104. In some implementations, an output 302 may be generated that indicates an estimated score 124 for one or more frames of video data 106. In some implementations, the output 302 may also include an indication of particular video characteristics 120 of the frame or an indication of particular network, application, or device characteristics associated with the frame. In some implementations, the computing device 502 may include one or more servers 112, or other computing devices 502, that receive the video data 104 from another computing device 502. The machine learning system 102 may then determine one or more estimated scores 124 associated with the received video data 104 and transmit an output 302 or other data indicative of the estimated score(s) 124 to the computing device 502 from which the video data 104 was received. In other implementations, the machine learning system 102 may be deployed to a computing device 502, in some cases as part of an SDK, and used to determine estimated scores 124 for video data 104 stored on the computing device 502 to which the machine learning system 102 was deployed. Analysis of video data 104 without transmitting the video data 104 to other computing devices 502 may maintain the privacy of the video data 104.

Other modules 526 may also be present in the memory 518. For example, other modules 526 may include user interface modules for generating user interfaces that solicit quality scores 106 from users 108 or that receive user input interacting with an output 302. Other modules 526 may also include encryption modules to encrypt and decrypt communications between computing devices 502, authentication modules to authenticate communications sent or received by computing devices 502, a permission module to assign, determine, and manage user permissions to access or modify data associated with computing devices 502, and so forth.

Other data 528 within the data store(s) 522 may include configurations, settings, preferences, and default values associated with computing devices 502. Other data 528 may also include encryption keys and schema, access credentials, and so forth. Other data 528 may additionally include rules or criteria for selection of video data 104 to be provided to a user device 110. Additionally, while implementations described herein relate to determining quality scores 106 indicative of the quality of video data 104, in other implementations, the techniques described herein may be used to determine a quality of audio data or other types of data. Further, in some cases, a video may also include audio output, and quality scores 106 associated with the audio output may also be acquired from users 108 and used to generate training data 122 to train a machine learning system 102.

In different implementations, different computing devices 502 may have different capabilities or capacities. For example, servers 112 may have greater processing capabilities or data storage capacity than user devices 110.

Figure 6:
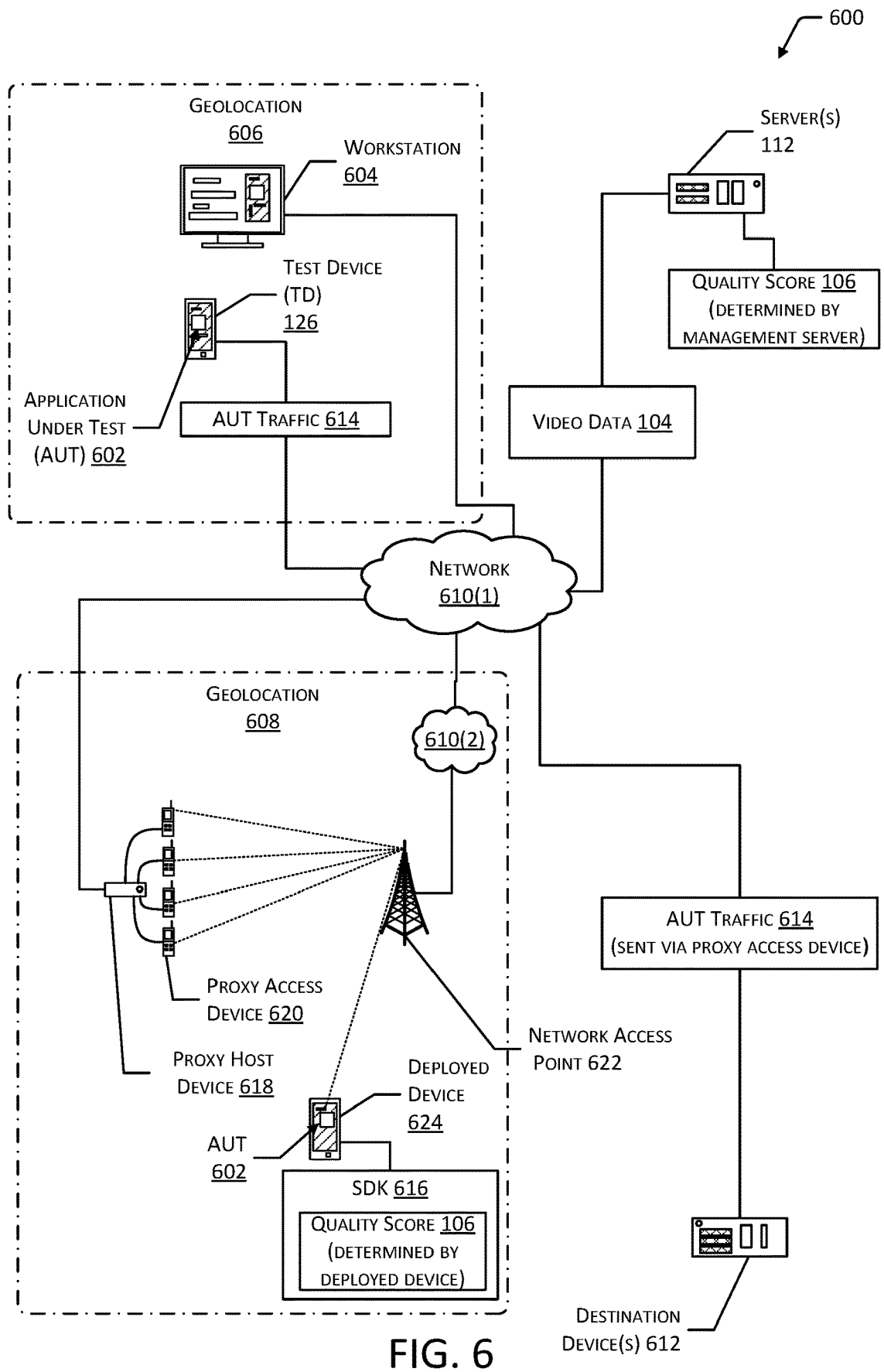
FIG. 6 depicts an implementation of a system for testing applications that utilize network resources, in which the quality of video output presented while executing the application may indicate network or application performance.

FIG. 6 depicts an implementation of a system 600 for testing applications that utilize network resources, in which the quality of video output 116 presented while executing the application may indicate network or application performance. An application under test (AUT) 602 may be executed on a computing device 502, such as a test device (TD) 126, a workstation 604, and so forth. When executing, the AUT 602 may generate, send, or receive video data 104, present video output 116 based on video data 104, or send data to another device that causes the other device to present the video output 116. The TD 126 may include a mobile device such as a smart phone, tablet computer, wearable computing device, and so forth. The workstation 604 may include a laptop, desktop computer, and so forth. The AUT 602 may be an application that is at any stage in a development or maintenance lifecycle. For example, the AUT 602 may include software that has not yet been released (e.g., an alpha, prerelease, or pre-launch version), or may include a previously released version that is undergoing testing. The workstation 604 may include an integrated development environment (IDE) to facilitate the creation and editing of program code, debugging, compiling, and so forth. In some implementations, the workstation 604 may comprise an emulator or simulator that is designed to execute the AUT 602 as though the AUT 602 were executing on another piece of hardware, under a different operating system, and so forth.

The TD 126 or workstation 604 on which the AUT 602 is executed may be located at a first geolocation 606, which may be separate from a second geolocation 608. A geolocation may include a geographic location, such as a particular room, building, city, state, country, and so forth. For example, a geolocation may be specified by a set of coordinates with regard to latitude and longitude on the surface of the Earth.

One or more of the TD 126 or the workstation 604 may be connected to a first network 610(1). The first network 610(1) may, in turn, be connected to or be part of a larger network. For example, the first network 610(1) may comprise the Internet. The connection used by the TD 128 or the workstation 604 may include, but is not limited to, a wired Ethernet connection, a wireless local area network (WLAN) connection such as Wi-Fi, and so forth. For example, the first geolocation 606 may include an office, and the TD 126 may connect to a local Wi-Fi access point that is connected via Ethernet cable to a router. The router, in turn, may be connected to a cable modem that provides connectivity to the Internet. During operation, the AUT 602 may access an external resource, such as one or more destination devices 612.

The AUT 602 may generate AUT traffic 614 that is exchanged with the destination device(s) 612 during operation. Traditionally, the AUT traffic 614 generated by the TD 126 at the first geolocation 606 would be sent to the first network 610(1) and on to the destination device 612. However, this traditional situation limits the ability to generate test data to data that reflects conditions associated with the first geolocation 606 and first network 610(1). Additionally, this traditional situation may require transmission or presentation of video data 104 associated with an AUT 602.

To enable the AUT 602 to be tested under conditions associated with different geolocations, such as the second geolocation 608, and different networks 610, a software development kit (SDK) 616 may be incorporated into the AUT 602. In other implementations, techniques other than an SDK 616 may be used to provide the functionality described herein. For example, lines of computer code that provide the functionality of at least a portion of the SDK 616 may be incorporated into the code base of the AUT 602. The SDK 616 may provide a user interface that allows for the redirection of the AUT traffic 614. For example, the SDK 616 may comprise instructions to establish communication with one or more servers 112 that may include modules for coordinating the activities of devices and analyzing data determined from the devices. In other implementations, an SDK 616 may be used to determine an estimated score 124 associated with video data 104 without requiring transmission of the video data 104 to other devices. For example, an AUT 602 may execute on a device associated with a machine learning system 102, and the SDK 616 may include or interact with the machine learning system 102. In some implementations, the SDK 616 may then send the estimated score 124 or other data indicative of the quality of the video data 104 to one or more other devices, rather than sending the video data 104 itself. As a result, an estimated score 124 indicative of the quality of video associated with an AUT 602 may be determined without requiring transmission of video data 104 to other devices, which may maintain the privacy of the video data 104.

In cases where data is sent to a server 112, the server 112 may coordinate the activities of one or more proxy host devices 618 or proxy access devices 620. The proxy host device 618 may connect to the first network 610(1) and to one or more of the proxy access devices 620. In one implementation, the proxy host device 618 may include a server, desktop computer, tablet, or other type of computing device to which eight proxy access devices 620 are connected using a wired connection, such as a cable connecting each proxy access device 620 to a USB port of the proxy host device 618. While FIG. 6 depicts a single proxy host device 618 and four proxy access devices 620, any number of proxy host devices 618 and proxy access devices 620 may be used. For example, proxy host devices 618 and proxy access devices 620 may be placed in an enclosure having from one to three trays, slots, or other types of compartments, each of which may store a proxy host device 618 and one or more proxy access devices 620. Continuing the example, an enclosure may contain three proxy host devices 618 and twenty-four proxy access devices 620, with eight proxy access devices 620 communicating with each proxy host device 618.

The proxy access devices 620 may connect to a network access point 622 that provides connectivity to a second network 610(2). For example, the proxy access devices 620 may include commodity cellphones, the network access points 622 may include cell phone towers, and the second network 610(2) may include a WWAN, such as a wireless cellular data network (WCDN). The second network 610(2) may in turn communicate with the first network 610(1). For example, a WCDN operated by a telecommunication company may interconnect or have a peering agreement with an Internet backbone provider. As a result, a user 108 of the second network 610(2) may be able to access resources on the first network 610(1), and vice versa. In some implementations, the proxy access devices 620 may be capable of communication with the destination device(s) 612 or other devices using the second network 610(2) or another network 610, such as a cellular network, without communicating using the first network 610(1).

The proxy access devices 620 may be located at a second geolocation 608 that is different from the first geolocation 606 of the TD 126. For example, the proxy access devices 620 may be located in another city, state, country, and so forth that differs from the location of the TD 126. As part of the testing process for the AUT 602, a user interface may be presented to enable a user 108 at the first geolocation 606 to select one or more of a particular geolocation 608 or particular proxy access device 620 to use during testing. The server(s) 112 may maintain information about the proxy access devices 620, such as geolocation 608, availability, cost, type of proxy access device 620, and so forth. The server(s) 112 may coordinate establishment of a connection between the AUT 602 and the proxy access device 620 that was selected.

During testing, the AUT traffic 614 may be routed through the first network 610(1) to the proxy host device 618, through the proxy access device 620 to the second network 610(2), and then on to the first network 610(1) to ultimately arrive at the destination device 612. The AUT traffic 614 may include outbound application traffic sent from the AUT 602 to the destination device 612 and inbound application traffic sent from the destination device 612 to the AUT 602. In some cases, at least a portion of the AUT traffic 614 may include video data 104.

During operation, the AUT 602 may direct outbound application traffic to the proxy host device 618, which transfers the outbound application traffic to the proxy access device 620, which then sends the outbound application traffic to the second network 610(2). The second network 610(2) may send the outbound application traffic to the destination device 612. Inbound application traffic from the destination device 612 may follow the reverse path. The server(s) 112 may collect log data associated with operation of the system 600, such as information associated with operation of the proxy access device 620, packet capture of data transferred by the proxy host device 618, and so forth. Log data may also indicate, for a particular instant in time, one or more of: a current page on a website, type of network that the proxy access device 620 is connected to, quantity of data received, quantity of data transmitted, latency to the destination device 612, data throughput, received signal strength, transmit power, cost associated with data transfer on the second network 610(2), and so forth. Data collected by the server(s) 112 may also include video data 104. For example, a machine learning system 102 associated with the server(s) 112 may determine one or more estimated scores 124 for the video data 104 based on video characteristics 120 of the video data 104. The data collected by the server(s) 112 may therefore represent the AUT 602 operating on a real-world second network 610(2) at a desired geolocation 608. The techniques described with regard to FIGS. 1-5 may be used to determine the quality of video data 104 presented during execution of the AUT 602. Log data or other data indicative of operation of the AUT 602 may therefore also include an output 302 such as that described with regard to FIG. 3, one or more quality scores 106, or other data indicative of the quality of video data 104.

In some implementations, instead of, or in addition to data determined by the server(s) 112, one or more deployed devices 624 may provide deployed log data to the server(s) 112. Deployed devices 624 may include, but are not limited to, smartphones, laptops, tablet computers, embedded devices, wearable computing devices, appliances, automobiles, aircraft, and so forth. A deployed device 624 may execute the AUT 602 that incorporates the SDK 616. In some implementations, the SDK 616 may incorporate or interact with a machine learning system 102 to determine an estimated score 124 associated with video data 104. For example, the AUT 602 executing on the deployed device 624 may be associated with video data 104, and the deployed device 624 may determine an estimated score 124 based on the video characteristics 120 of the video data 104. The deployed device 624 may then transmit data indicative of the estimated score 124 to other devices without transmitting the video data 104 itself, thus maintaining the privacy of the video data 104.

Data determined by operation of the proxy access devices 620 may be used to generate reports, determine modifications to the AUT 602, and so forth. While the AUT 602 is executing on the proxy access devices 620, one or more of the proxy access devices 620 or the proxy host devices 618 may display or store proprietary information. For example, it may be desirable to prevent individuals located at the second geolocation 608 from viewing displays associated with the proxy access devices 620, accessing data stored on the proxy access devices 620 or proxy host devices 618, or tampering with the devices themselves. As such, the proxy host devices 618 and proxy access devices 620 may be maintained in a secure enclosure that is configured to limit access to the devices, and in the event of an unauthorized access, cause one or more devices to be locked, deactivated, or delete data from the devices.

Privacy of video data 104, data regarding a user 108, data regarding an application, and so forth may be preserved by transmitting the video data 104, or other data associated with an AUT 602, to a device maintained in a secure enclosure. In other cases, a secure deployed device 624 may preserve the privacy of the video data 104, data regarding the user 108, and data regarding the application. For example, an SDK 616 that incorporates at least a portion of the functionality of a trained machine learning system 102 may be deployed to a device, and the device receiving the SDK 616 may be used to determine an estimated score 124 for video data 104 without providing access to the video data 104, or other data stored on the deployed device 624, to other devices.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
    one or more non-transitory memories storing computer-executable instructions; and
    one or more hardware processors to execute the computer-executable instructions to:
        provide first video data to a device associated with a first user, wherein the first video data is associated with a first score indicative of a quality of the first video data;
        receive first user input indicative of a second score, wherein the second score is indicative of the quality of the first video data;
        determine, based on a first difference between the first score and the second score, a consistency metric associated with the first user;
        provide second video data to the device associated with the first user;
        receive second user input indicative of a third score, wherein the third score is indicative of a quality of the second video data, and wherein the second video data is associated with one or more first characteristics;
        determine a fourth score based on the third score and the consistency metric associated with the first user;
        use the fourth score and the one or more first characteristics of the second video data as training data to train a machine learning system to determine scores for video data based on characteristics of the video data;
        determine one or more second characteristics of third video data; and
        use the machine learning system to determine a fifth score associated with the third video data based on the one or more second characteristics.

2. The system of claim 1, further comprising computer-executable instructions to:
    determine fourth video data provided to the device associated with the first user at a first time, wherein the fourth video data is associated with third user input indicative of a sixth score, and wherein the sixth score is indicative of a quality of the fourth video data;
    at a second time subsequent to the first time, provide the fourth video data to the device associated with the first user;
    receive fourth user input indicative of a seventh score indicative of the quality of the fourth video data; and
    determine a second difference between the sixth score and the seventh score, wherein the consistency metric is further determined based on the second difference.

3. The system of claim 1, further comprising computer-executable instructions to:
    determine a portion of the third video data that is associated with the fifth score;
    determine a characteristic of the one or more second characteristics for the portion of the third video data;
    determine that the characteristic of the one or more second characteristics deviates from a threshold value; and
    generate an output that indicates the portion of the third video data and the characteristic of the one or more second characteristics.

4. The system of claim 1, further comprising computer-executable instructions to:

determine a portion of the third video data that is associated with the fifth score, wherein the portion of the third video data is associated with a first time;
determine that the fifth score is less than a threshold value;
determine one or more third characteristics indicative of one or more of:
  network performance associated with the first time, device performance associated with the first time, or application performance associated with the first time; and
generate an output that indicates the portion of the third video data and the one or more third characteristics.

5. The system of claim 1, wherein the one or more first characteristics include one or more of:
  a frame rate associated with the second video data;
  an amount of spread of edges in a first frame of the second video data;
  a variation in the amount of spread of edges between the first frame and at least one second frame of the second video data;
  an amount of appearance of block structures in the first frame;
  a variation in the amount of appearance of block structures between the first frame and the at least one second frame;
  a color saturation of the first frame;
  a variation in the color saturation between the first frame and the at least one second frame;
  a contrast of the first frame;
  a variation in the contrast between the first frame and the at least one second frame;
  a brightness of the first frame;
  a variation in the brightness between the first frame and the at least one second frame;
  presence of a graphic indicative of buffering in the first frame; or
  an amount of variation in a displayed image that is less than a threshold amount between the first frame and the at least one second frame.

6. The system of claim 1, further comprising computer-executable instructions to:
  determine user data indicative of one or more of:
    a characteristic of the first user; or
    one or more components of the device associated with the first user;
  wherein the consistency metric is further determined based on the one or more of the characteristic of the first user or the one or more components of the device.

7. The system of claim 1, further comprising computer-executable instructions to:
  process the third video data using the machine learning system to determine the one or more second characteristics;
  generate an embedding indicative of values for a characteristic of the one or more second characteristics; and
  based on the embedding, determine a mean value, a minimum value, a maximum value, and a standard deviation for the characteristic of the one or more second characteristics across a plurality of frames of the third video data.

8. A system comprising:
  one or more non-transitory memories storing computer-executable instructions; and
  one or more hardware processors to execute the computer-executable instructions to:
    provide first video data to a first device;
    receive first user input indicative of a first score, wherein the first score is indicative of a quality of the first video data;
    determine one or more first characteristics of the first video data;
    use the first score and the one or more first characteristics of the first video data as training data to train a machine learning system to determine scores based on characteristics of video data;
    determine one or more second characteristics of a first frame of second video data;
    process the second video data using the machine learning system to determine a second score associated with the first frame based on the one or more second characteristics;
    determine one or more of: a network performance characteristic, a device characteristic, or an application performance characteristic associated with the first frame; and
    generate an output that indicates the first frame and the one or more of the network performance characteristic, the device characteristic, or the application performance characteristic.

9. The system of claim 8, further comprising computer-executable instructions to:
  prior to providing the first video data, provide second video data to the first device, wherein the second video data is associated with a third score indicative of a quality of the second video data;
  receive second user input indicating a fourth score indicative of the quality of the second video data; and
  determine a difference between the third score and the fourth score;
  wherein training of the machine learning system is further based on the difference between the third score and the fourth score.

10. The system of claim 8, further comprising computer-executable instructions to:
  process the first video data using the machine learning system to determine the one or more first characteristics of the first video data; and
  determine that a quantity of video data previously provided to devices associated with users and having the one or more first characteristics is less than a threshold quantity;
  wherein the first video data is provided based on the quantity of video data being less than the threshold quantity.

11. The system of claim 8, further comprising computer-executable instructions to:
  access source video data;
  determine a plurality of portions of the source video data that are each associated with the one or more first characteristics, wherein the plurality of portions include the first video data, and each portion of the plurality of portions has a selected length; and
  select the first video data to be provided to the first device based on one or more of: a random selection from among the plurality of portions, a characteristic of the first device, or a characteristic of a user account associated with the first device.

12. The system of claim 8, further comprising computer-executable instructions to:
  determine third video data provided to the first device at a first time, wherein the third video data is associated with second user input that indicates a third score indicative of a quality of the third video data;

at a second time subsequent to the first time, provide the third video data to the first device;
receive third user input indicating a fourth score indicative of a quality of the third video data; and
determine a difference between the third score and the fourth score;
wherein training of the machine learning system is further based on the difference between the third score and the fourth score.

13. The system of claim 8, further comprising computer-executable instructions to:
process the first video data using the machine learning system to determine the one or more first characteristics;
process third video data using the machine learning system to determine one or more third characteristics; and
receive second user input indicating a third score indicative of a quality of the third video data;
wherein the machine learning system is further trained using the one or more first characteristics, the first score, the one or more third characteristics, and the third score as training data.

14. The system of claim 8, further comprising computer-executable instructions to:
determine variation of at least one characteristic of the one or more first characteristics based on one or more of: a second frame of the first video data that precedes the first frame, or a third frame of the first video data that follows the first frame; and
include an indication of the variation in the output.

15. A system comprising:
one or more non-transitory memories storing computer-executable instructions; and
one or more hardware processors to execute the computer-executable instructions to:
provide first data to one or more first devices associated with a first user, wherein the first data is associated with a first score indicative of a quality of the first data;
receive first user input indicating a second score indicative of the quality of the first data;
determine a first difference between the first score and the second score;
provide second data to the one or more first devices, wherein the second data is associated with one or more first characteristics;
receive second user input indicating a third score indicative of a quality of the second data; and
train a machine learning system to determine scores based on characteristics of data using the first difference, the third score, and the one or more first characteristics as training data.

16. The system of claim 15, wherein the first data and the second data include one or more of audio data or video data.

17. The system of claim 15, further comprising computer-executable instructions to:
provide third data to the one or more first devices, wherein the third data was previously presented using the one or more first devices and is associated with third user input indicating a fourth score indicative of a quality of the third data;
receive fourth user input indicating a fifth score indicative of the quality of the third data; and
determine a second difference between the fourth score and the fifth score, wherein the machine learning system is further trained using the second difference as training data.

18. The system of claim 15, further comprising computer-executable instructions to:
determine a first value for a second characteristic of third data at a first time;
determine a second value for the second characteristic at a second time prior to the first time;
determine a third value for the second characteristic at a third time subsequent to the first time;
based on the first value, the second value, and the third value, determine a fourth value indicative of a variation for the second characteristic; and
process the third data to determine a fourth score indicative of a quality of the third data based on the first value and the fourth value.

19. The system of claim 15, further comprising computer-executable instructions to:
determine one or more second characteristics of third data;
process the third data using the machine learning system to determine a fourth score indicative of a quality of a portion of the third data based on the one or more second characteristics;
determine a subset of the one or more second characteristics that deviate from a threshold value; and
determine an output that indicates the portion of the third data and the subset of the one or more second characteristics.

20. The system of claim 15, further comprising computer-executable instructions to:
determine one or more second characteristics of third data;
process the third data using the machine learning system to determine a fourth score indicative of a quality of a portion of the third data based on the one or more second characteristics;
determine a time associated with the portion of the third data;
determine one or more third characteristics indicative of one or more of network performance, device performance, or application performance associated with the time associated with the portion of the third data; and
determine an output that indicates the portion of the third data and at least a subset of the one or more third characteristics.

* * * * *